US010909137B2

(12) United States Patent
Blevins et al.

(10) Patent No.: US 10,909,137 B2
(45) Date of Patent: Feb. 2, 2021

(54) STREAMING DATA FOR ANALYTICS IN PROCESS CONTROL SYSTEMS

(71) Applicant: FISHER-ROSEMOUNT SYSTEMS, INC., Round Rock, TX (US)

(72) Inventors: Terrence L. Blevins, Round Rock, TX (US); Mark J. Nixon, Round Rock, TX (US); Ken J. Beoughter, Round Rock, TX (US); Daniel D. Christensen, Austin, TX (US); J. Michael Lucas, Leicester (GB); Paul R. Muston, Narborough (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 217 days.

(21) Appl. No.: 14/506,863

(22) Filed: Oct. 6, 2014

(65) Prior Publication Data

US 2016/0098388 A1  Apr. 7, 2016

(51) Int. Cl.
*G06F 16/25* (2019.01)
*G05B 19/418* (2006.01)

(52) U.S. Cl.
CPC .......... *G06F 16/258* (2019.01); *G06F 16/254* (2019.01); *G05B 19/4185* (2013.01); *Y02P 90/02* (2015.11)

(58) Field of Classification Search
CPC .................................................... H04L 65/607
See application file for complete search history.

(56) References Cited

U.S. PATENT DOCUMENTS

| | | | |
|---|---|---|---|
| 4,451,047 A | 5/1984 | Herd et al. |
| 4,593,367 A | 6/1986 | Slack et al. |
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |

(Continued)

FOREIGN PATENT DOCUMENTS

| | | |
|---|---|---|
| AU | 2010257310 A1 | 7/2012 |
| CN | 1170464 A | 1/1998 |

(Continued)

OTHER PUBLICATIONS

Search Report for Application No. GB1513617.9, dated Jan. 21, 2016.

(Continued)

*Primary Examiner* — Mohammad S Rostami
(74) *Attorney, Agent, or Firm* — Marshall, Gerstein & Borun LLP

(57) ABSTRACT

Techniques for streaming big data in a process plant are disclosed. Generally, these techniques facilitate storage or communication of process control data, including alarms, parameters, events, and the like, in near real-time. Receivers of big data, such as big data historians or devices requesting specific data, are configured via an initial set of metadata, and thereafter receive updated metadata upon requesting it from the transmitting device, such as when the receiving device encounters an identifier in the data, which identifier was not defined in the metadata previously received.

58 Claims, 9 Drawing Sheets

(56) References Cited

U.S. PATENT DOCUMENTS

| | | |
|---|---|---|
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,710,723 A | 1/1998 | Hoth et al. |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 * | 8/2002 | Varma .................. G06F 8/38 700/28 |
| 6,463,352 B1 | 10/2002 | Tadokoro et al. |
| 6,529,780 B1 * | 3/2003 | Soergel ................ B21B 37/00 700/10 |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,778,873 B1 | 8/2004 | Wang et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 | 12/2009 | Veeningen et al. |
| 7,640,007 B2 | 12/2009 | Chen et al. |
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,890,461 B2 | 2/2011 | Oeda et al. |
| 7,925,979 B2 | 4/2011 | Forney et al. |
| 7,930,639 B2 | 4/2011 | Baier et al. |
| 7,934,095 B2 | 4/2011 | Laberteaux et al. |

(56) References Cited

U.S. PATENT DOCUMENTS

| | | |
|---|---|---|
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 * | 7/2012 | Eshet ............ H04N 21/23424 348/515 |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,886,598 B1 | 11/2014 | Emigh |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,244,452 B2 | 1/2016 | Brandes et al. |
| 9,285,795 B2 | 3/2016 | Nixon et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B2 | 8/2016 | McLeod et al. |
| 9,430,114 B1 | 8/2016 | Dingman et al. |
| 9,459,809 B1 | 10/2016 | Chen et al. |
| 9,466,038 B2 | 10/2016 | Kezeu |
| 9,516,354 B1 * | 12/2016 | Verheem ............ H04N 21/2187 |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0077711 A1 | 6/2002 | Nixon et al. |
| 2002/0080174 A1 | 6/2002 | Kodosky et al. |
| 2002/0087419 A1 * | 7/2002 | Andersson ......... G06Q 10/0637 705/7.36 |
| 2002/0094085 A1 | 7/2002 | Roberts |
| 2002/0120475 A1 | 8/2002 | Morimoto |
| 2002/0123864 A1 | 9/2002 | Eryurek et al. |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2002/0188366 A1 | 12/2002 | Pepper et al. |
| 2002/0194112 A1 | 12/2002 | dePinto et al. |
| 2002/0194209 A1 * | 12/2002 | Bolosky ............... H04L 9/0656 |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0186927 A1 | 9/2004 | Eryurek et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2004/0259533 A1 | 12/2004 | Nixon et al. |
| 2005/0005259 A1 | 1/2005 | Avery et al. |
| 2005/0007249 A1 | 1/2005 | Eryurek et al. |
| 2005/0033481 A1 | 2/2005 | Budhraja et al. |
| 2005/0049835 A1 | 3/2005 | Mayer et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |

(56) References Cited

U.S. PATENT DOCUMENTS

| | | |
|---|---|---|
| 2005/0187649 A1 | 8/2005 | Funk et al. |
| 2005/0197806 A1 | 9/2005 | Eryurek et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2005/0289183 A1* | 12/2005 | Kaneko ............... G11B 27/034 |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0161394 A1 | 7/2006 | Dulberg et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1* | 3/2007 | Cahill ............... G05B 23/027 715/733 |
| 2007/0078696 A1 | 4/2007 | Hardin |
| 2007/0085840 A1* | 4/2007 | Asaka ............... G06F 3/0488 345/173 |
| 2007/0112574 A1 | 5/2007 | Greene |
| 2007/0118516 A1 | 5/2007 | Li et al. |
| 2007/0130206 A1 | 6/2007 | Zhou et al. |
| 2007/0130310 A1 | 6/2007 | Batke et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1 | 8/2007 | Nixon et al. |
| 2007/0185754 A1 | 8/2007 | Schmidt |
| 2007/0211079 A1* | 9/2007 | Nixon ............... G05B 19/0426 345/619 |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0021874 A1* | 1/2008 | Dahl ............... G06F 16/24534 |
| 2008/0040719 A1 | 2/2008 | Shimizu et al. |
| 2008/0046104 A1 | 2/2008 | Van Camp et al. |
| 2008/0058968 A1* | 3/2008 | Sharma ............... G05B 19/106 700/84 |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0085682 A1 | 4/2008 | Rao |
| 2008/0086428 A1 | 4/2008 | Wallace |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0109090 A1 | 5/2008 | Esmaili et al. |
| 2008/0114710 A1 | 5/2008 | Pucher |
| 2008/0125912 A1 | 5/2008 | Heilman et al. |
| 2008/0126352 A1 | 5/2008 | Case |
| 2008/0126408 A1 | 5/2008 | Middleton |
| 2008/0126665 A1 | 5/2008 | Burr et al. |
| 2008/0134215 A1 | 6/2008 | Thibault et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0048853 A1 | 2/2009 | Hall |
| 2009/0049073 A1* | 2/2009 | Cho ............... H04N 21/2343 |
| 2009/0059814 A1 | 3/2009 | Nixon et al. |
| 2009/0065578 A1* | 3/2009 | Peterson ............... G05B 19/048 235/382 |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089247 A1 | 4/2009 | Blevins et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0198826 A1* | 8/2009 | Ishijima ............... H04L 69/161 709/231 |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284348 A1 | 11/2009 | Pfeffer |
| 2009/0284383 A1 | 11/2009 | Wiles et al. |
| 2009/0292514 A1 | 11/2009 | McKim et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0175012 A1 | 7/2010 | Allstrom et al. |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0218010 A1 | 8/2010 | Musti et al. |
| 2010/0222899 A1 | 9/2010 | Blevins et al. |
| 2010/0234969 A1 | 9/2010 | Inoue |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0299105 A1 | 11/2010 | Vass et al. |
| 2010/0305736 A1 | 12/2010 | Arduini |
| 2010/0318934 A1 | 12/2010 | Blevins et al. |
| 2011/0019725 A1 | 1/2011 | Keller |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0185292 A1 | 7/2011 | Chawla et al. |
| 2011/0191277 A1 | 8/2011 | Ag ndez Dominguez et al. |

(56) References Cited

U.S. PATENT DOCUMENTS

| | | |
|---|---|---|
| 2011/0238189 A1* | 9/2011 | Butera .............. G05B 19/41835 700/30 |
| 2011/0258138 A1 | 10/2011 | Kulkarni et al. |
| 2011/0270855 A1* | 11/2011 | Antonysamy ....... G06F 16/1794 707/756 |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0282836 A1 | 11/2011 | Erickson et al. |
| 2011/0295578 A1 | 12/2011 | Aldrich et al. |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0016816 A1 | 1/2012 | Yanase et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0197852 A1 | 8/2012 | Dutta et al. |
| 2012/0203728 A1 | 8/2012 | Levine |
| 2012/0210083 A1* | 8/2012 | Lawrence ............... G06F 16/14 711/162 |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0240181 A1 | 9/2012 | McCorkendale et al. |
| 2012/0249588 A1 | 10/2012 | Tison et al. |
| 2012/0251996 A1 | 10/2012 | Jung et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0321273 A1* | 12/2012 | Messmer .............. H04N 13/128 386/224 |
| 2012/0324365 A1 | 12/2012 | Momchilov et al. |
| 2012/0331541 A1 | 12/2012 | Hamilton, II et al. |
| 2013/0006696 A1 | 1/2013 | Louie et al. |
| 2013/0007223 A1* | 1/2013 | Luby .............. H04N 21/23106 709/219 |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0124749 A1 | 5/2013 | Thang et al. |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1* | 6/2013 | Addepalli ............... H04L 67/10 707/792 |
| 2013/0159200 A1 | 6/2013 | Paul et al. |
| 2013/0166542 A1 | 6/2013 | Kulkarni et al. |
| 2013/0169526 A1 | 7/2013 | Gai et al. |
| 2013/0171599 A1 | 7/2013 | Bleich et al. |
| 2013/0184847 A1 | 7/2013 | Fruh et al. |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1* | 11/2013 | Fletcher ................ G06F 9/5011 718/104 |
| 2013/0321578 A1* | 12/2013 | Dini ..................... H04N 21/235 348/43 |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0078163 A1 | 3/2014 | Cammert et al. |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122026 A1 | 5/2014 | Aberg et al. |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0129002 A1 | 5/2014 | Brandes et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1* | 6/2014 | Clemmer .............. H04L 65/605 709/203 |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1* | 7/2014 | Zhou ................ G06F 17/30917 707/803 |
| 2014/0207415 A1 | 7/2014 | Bhutani et al. |
| 2014/0229970 A1* | 8/2014 | Besehanic ........ H04N 21/25883 725/20 |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0282722 A1 | 9/2014 | Kummer et al. |
| 2014/0297225 A1 | 10/2014 | Petroski et al. |
| 2014/0303754 A1 | 10/2014 | Nixon et al. |
| 2014/0316579 A1 | 10/2014 | Taylor et al. |
| 2014/0335480 A1 | 11/2014 | Asenjo et al. |
| 2014/0358256 A1 | 12/2014 | Billi et al. |
| 2014/0359552 A1 | 12/2014 | Misra et al. |
| 2014/0372378 A1* | 12/2014 | Long ................... G06F 11/1451 707/646 |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0043626 A1 | 2/2015 | Williams et al. |
| 2015/0067163 A1 | 3/2015 | Bahnsen et al. |
| 2015/0077263 A1 | 3/2015 | Ali et al. |
| 2015/0106578 A1* | 4/2015 | Warfield ................ G06F 3/0613 711/158 |
| 2015/0172872 A1 | 6/2015 | Alsehly et al. |
| 2015/0177718 A1 | 6/2015 | Vartiainen et al. |
| 2015/0185716 A1 | 7/2015 | Wichmann et al. |
| 2015/0188975 A1* | 7/2015 | Hansen ............... H04L 67/1068 709/231 |
| 2015/0193418 A1 | 7/2015 | Koska et al. |
| 2015/0199494 A1 | 7/2015 | Koduri et al. |
| 2015/0212679 A1 | 7/2015 | Liu |

(56) References Cited

U.S. PATENT DOCUMENTS

| | | | |
|---|---|---|---|
| 2015/0220080 A1 | 8/2015 | Nixon et al. |
| 2015/0220311 A1 | 8/2015 | Salter |
| 2015/0221152 A1 | 8/2015 | Andersen |
| 2015/0222731 A1 | 8/2015 | Shinohara et al. |
| 2015/0246852 A1 | 9/2015 | Chen et al. |
| 2015/0254330 A1 | 9/2015 | Chan et al. |
| 2015/0261215 A1 | 9/2015 | Blevins et al. |
| 2015/0277399 A1 | 10/2015 | Maturana et al. |
| 2015/0278397 A1* | 10/2015 | Hendrickson ..... G06F 17/30958 707/798 |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0281607 A1 | 9/2016 | Asati et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0102969 A1 | 4/2017 | Kochunni et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0223075 A1 | 8/2017 | Hong et al. |
| 2017/0235298 A1 | 8/2017 | Nixon et al. |
| 2017/0236067 A1 | 8/2017 | Tjiong |
| 2017/0238055 A1 | 8/2017 | Chang et al. |
| 2017/0255826 A1 | 9/2017 | Chang et al. |
| 2017/0255827 A1 | 9/2017 | Chang et al. |
| 2017/0255828 A1 | 9/2017 | Chang et al. |
| 2017/0255829 A1 | 9/2017 | Chang et al. |
| 2018/0012510 A1 | 1/2018 | Asenjo et al. |
| 2018/0151037 A1 | 5/2018 | Morgenthau et al. |
| 2018/0343544 A1 | 11/2018 | Fan et al. |
| 2019/0032948 A1 | 1/2019 | Nayak et al. |

FOREIGN PATENT DOCUMENTS

| | | |
|---|---|---|
| CN | 1409179 A | 4/2003 |
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101169799 A | 4/2008 |
| CN | 101187869 A | 5/2008 |
| CN | 101221415 A | 7/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101822050 A | 9/2010 |
| CN | 101828195 A | 9/2010 |
| CN | 101867566 A | 10/2010 |
| CN | 102063097 A | 5/2011 |
| CN | 102073448 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102780568 A | 11/2012 |
| CN | 102801779 A | 11/2012 |
| CN | 102867237 A | 1/2013 |
| CN | 103106188 A | 5/2013 |
| CN | 103403686 A | 11/2013 |
| CN | 103576638 A | 2/2014 |
| CN | 103699698 A | 4/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 897 453 A1 | 8/2007 |
| FR | 2 966 625 A1 | 4/2012 |
| GB | 2 336 977 B | 11/1999 |
| GB | 2 347 234 A | 8/2000 |
| GB | 2 336 923 B | 6/2002 |
| GB | 2 403 028 A | 12/2004 |
| GB | 2 453 426 A | 4/2009 |
| GB | 2 485 092 A | 5/2012 |
| GB | 2 494 778 A | 3/2013 |
| GB | 2 512 984 A | 10/2014 |
| GB | 2 512 997 A | 10/2014 |
| GB | 2 514 644 A | 12/2014 |
| GB | 2 532 849 A | 6/2016 |
| GB | 2 534 628 A | 8/2016 |
| GB | 2 536 339 A | 9/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 05-346807 A | 12/1993 |
| JP | 06-052145 A | 2/1994 |
| JP | 06-307897 A | 11/1994 |
| JP | 08-234951 | 9/1996 |
| JP | 9-160798 | 6/1997 |
| JP | 9-196714 A | 7/1997 |
| JP | 09-330861 A | 12/1997 |
| JP | 10-116113 A | 5/1998 |
| JP | 10-326111 A | 12/1998 |
| JP | 11-327628 A | 11/1999 |
| JP | 2000-194414 A | 7/2000 |
| JP | 2000-214914 A | 8/2000 |
| JP | 2001-036542 A | 2/2001 |
| JP | 2001-195123 A | 7/2001 |
| JP | 2001-512593 A | 8/2001 |
| JP | 2001-265821 A | 9/2001 |

(56) References Cited

FOREIGN PATENT DOCUMENTS

| | | |
|---|---|---|
| JP | 2002-010489 A | 1/2002 |
| JP | 2002-024423 A | 1/2002 |
| JP | 2002-99325 A | 4/2002 |
| JP | 2003-029818 A | 1/2003 |
| JP | 2003-067523 A | 3/2003 |
| JP | 2003-109152 A | 4/2003 |
| JP | 2003-140741 A | 5/2003 |
| JP | 2003-167621 A | 6/2003 |
| JP | 2003-167624 A | 6/2003 |
| JP | 2003-177818 A | 6/2003 |
| JP | 2003-250232 A | 9/2003 |
| JP | 2003-295944 A | 10/2003 |
| JP | 2003-337794 A | 11/2003 |
| JP | 2004-030492 A | 1/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-265302 A | 9/2004 |
| JP | 2004-348582 A | 12/2004 |
| JP | 2004-537820 A | 12/2004 |
| JP | 2005-100072 A | 4/2005 |
| JP | 2005-107758 A | 4/2005 |
| JP | 2005-216137 A | 8/2005 |
| JP | 2005-242830 A | 9/2005 |
| JP | 2005-293600 A | 10/2005 |
| JP | 2005-301546 A | 10/2005 |
| JP | 2005-332093 A | 12/2005 |
| JP | 2006-172462 A | 6/2006 |
| JP | 2006-185120 A | 7/2006 |
| JP | 2006-221376 A | 8/2006 |
| JP | 2006-221563 A | 8/2006 |
| JP | 2006-260411 A | 9/2006 |
| JP | 2006-527426 A | 11/2006 |
| JP | 2007-137563 A | 6/2007 |
| JP | 2007-148938 A | 6/2007 |
| JP | 2007-164764 A | 6/2007 |
| JP | 2007-207065 A | 8/2007 |
| JP | 2007-242000 A | 9/2007 |
| JP | 2007-286798 A | 11/2007 |
| JP | 2007-299228 A | 11/2007 |
| JP | 2007-536631 A | 12/2007 |
| JP | 2007-536648 A | 12/2007 |
| JP | 2008-009793 A | 1/2008 |
| JP | 2008-065821 A | 3/2008 |
| JP | 2008-158971 A | 7/2008 |
| JP | 2008-171152 A | 7/2008 |
| JP | 2008-177929 A | 7/2008 |
| JP | 2008-305419 A | 12/2008 |
| JP | 2009-500767 A | 1/2009 |
| JP | 2009-044288 A | 2/2009 |
| JP | 2009-53938 A | 3/2009 |
| JP | 2009-064451 A | 3/2009 |
| JP | 2009-135892 A | 6/2009 |
| JP | 2009-140380 A | 6/2009 |
| JP | 2009-211522 A | 9/2009 |
| JP | 2009-251777 A | 10/2009 |
| JP | 2009-538567 A | 11/2009 |
| JP | 2010-181949 A | 8/2010 |
| JP | 2010-527486 A | 8/2010 |
| JP | 2010-250825 A | 11/2010 |
| JP | 2011-022920 A | 2/2011 |
| JP | 2011-034564 A | 2/2011 |
| JP | 2011-180629 A | 9/2011 |
| JP | 2011-204237 A | 10/2011 |
| JP | 2011-204238 A | 10/2011 |
| JP | 2012-022558 A | 2/2012 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-88953 A | 5/2012 |
| JP | 2012-190477 A | 10/2012 |
| JP | 2012-215547 A | 11/2012 |
| JP | 2012-527059 A | 11/2012 |
| JP | 2012/252604 A | 12/2012 |
| JP | 2014-116027 A | 6/2014 |
| JP | 2014-170552 A | 9/2014 |
| JP | 2014-523579 A | 9/2014 |
| TW | 201408020 A | 2/2014 |
| WO | WO-02/35302 A1 | 5/2002 |
| WO | WO-02/50971 | 6/2002 |
| WO | WO-03/073344 A2 | 9/2003 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2007/052342 A1 | 5/2007 |
| WO | WO-2008/042786 A2 | 4/2008 |
| WO | WO-2009/021900 A1 | 2/2009 |
| WO | WO-2009/046095 A1 | 4/2009 |
| WO | WO-2010/041462 A1 | 4/2010 |
| WO | WO-2011/120625 A1 | 10/2011 |
| WO | WO-2012/016012 A2 | 2/2012 |
| WO | WO-2012/022358 A1 | 2/2012 |
| WO | WO-2012/022381 A1 | 2/2012 |
| WO | WO-2012/096877 A1 | 7/2012 |
| WO | WO-2012/129400 A2 | 9/2012 |
| WO | WO-2012/177812 A1 | 12/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

International Search Report and Written Opinion for Application No. PCT/US2015,053931, dated Jan. 26, 2016.
Krumeich et al., "Big Data Analytics for Predictive Manufacturing Control—A Case Study from Process Industry," IEEE International Congress on Big Data, pp. 530-537 (2014).
Bassat et al., "Workflow Management Combined with Diagnostic and Repair Expert System Tools for Maintenance Operations," IEEE, pp. 367-375 (1993).
Search Report for Application No. GB1501042.4, dated Feb. 2, 2016.
Search Report for Application No. GB1517034.3, dated May 26, 2016.
Search Report for Application No. GB1517038.4, dated Mar. 22, 2016.
"IoT and Big Data Combine Forces," (2013). Retrieved from the Internet at: URL:http://wiki.advantech.com/images/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot/iot_in_manufacturing_january.pdf.
International Search Report and Written Opinion for Application No. PCT/US2015/020148, dated Jun. 18, 2015.
Smalley, "GE Invests in Project to Embed Predictive Analytics in Industrial Internet," (2013). Retrieved from the Internet at: URL:http://data-informed.com/ge-invests-in-proiect-to-embed-predictive-analytics-in-industrial-internet/.
U.S. Appl. No. 14/174,413, entitled "Collecting and Delivering Data to a Big Data Machine in a Process Control System", filed Feb. 6, 2014, 61 pages.
U.S. Appl. No. 14/212,493, entitled "Distributed Big Data in a Process Control System", filed Mar. 14, 2014, 61 pages.
"ANSI/ISA-S5.4-1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation*, 2011, Chapter 7.
Examination Report for Application No. GB1017192.4, dated May 28, 2014.
Examination Report for Application No. GB1017192.4, dated Sep. 5, 2013.

(56) References Cited

OTHER PUBLICATIONS

First Office Action for Chinese Application No. 201010589029.X, dated Dec. 10, 2013.
Notice of Reasons for Rejection for Japanese Application No. 2010-229513, dated Jul. 29, 2014.
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
U.S. Appl. No. 14/212,411, filed Mar. 14, 2014, "Determining Associations and Alignments of Process Elements and Measurements in a Process".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: http://forbes.com/sites/bwoo/2013/02/27/intel-drops-a-big-data-shocker/?partner=ya dated Feb. 27, 2013.
Communication Relating to the Results of the Partial International Search, dated Jul. 11, 2014.
International Search Report and Written Opinion for Application No. PCT/US2014/030627, dated Sep. 11, 2014.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mandavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.

Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Examination Report for Application No. EP 14724871.0, dated Aug. 17, 2016.
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-051114, dated Dec. 28, 2017.
Notice of Reasons for Rejection for Japanese Application No. 2014-051596, dated Jan. 9, 2018.
Notice of Reasons for Rejection for Japanese Application No. 2014-051597, dated Jan. 9, 2018.
Extended European Search Report for Application No. 17157505.3, dated Jun. 30, 2017.

(56) References Cited

OTHER PUBLICATIONS

First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emerging M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Decision of Refusal for Japanese Application No. 2014-048410, dated May 29, 2018.
Decision of Rejection for Chinese Application No. 201410097675.2, dated Jul. 2, 2018.
Examination Report for Application No. EP 14724871.0, dated Aug. 10, 2018.
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-048412, dated Feb. 27, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Apr. 10, 2018.
Notice of Reasons for Rejection for Japanese Application No. 2014-049919, dated Jul. 31, 2018.
Notice of Reasons for Rejection for Japanese Application No. 2014-049920, dated Feb. 20, 2018.
Notice of Reasons for Rejection for Japanese Application No. 2014-049920, dated Jun. 5, 2018.
Notice of Reasons for Rejection for Japanese Application No. 2014-051595, dated Jan. 16, 2018.
Notice of Reasons for Rejection for Japanese Application No. 2014-051595, dated May 29, 2018.
Notice of Reasons for Rejection for Japanese Application No. 2014-051596, dated Jan. 16, 2018.
Notice of Reasons for Rejection for Japanese Application No. 2014-051596, dated May 29, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097623.5, dated Jun. 26, 2018.
Second Office Action for Chinese Application No. 201410097675.2, dated Feb. 11, 2018.
Second Office Action for Chinese Application No. 201410097872.4 dated Jul. 12, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410097921.4, dated Jul. 5, 2018.
Second Office Action for Chinese Application No. 201410097922.9, dated Jan. 9, 2018.
Second Office Action for Chinese Application No. 201410098326.2, dated Jun. 19, 2018.
Second Office Action for Chinese Application No. 201410098327.7, dated Feb. 27, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
Decision of Refusal for Japanese Application No. 2014-049918, dated Aug. 21, 2018.
Decision of Refusal for Japanese Application No. 2014-051595, dated Sep. 11, 2018.
Decision of Refusal for Japanese Application No. 2014-051596, dated Oct. 23, 2018.
Examination Report for Application No. GB1402311.3, dated Sep. 28, 2018.
Examination Report for Application No. GB14724871.0, dated Oct. 8, 2018.

(56) References Cited

OTHER PUBLICATIONS

Final Rejection for Japanese Application No. 2014-049915, dated Nov. 6, 2018.
Notice of Reasons for Rejection for Japanese Application No. 2014-049916, dated Aug. 28, 2018.
Notice of Reasons for Rejection for Japanese Application No. 2014-049917, dated Dec. 4, 2018.
Notice of Reasons for Rejection for Japanese Application No. 2014-049920, dated Oct. 23, 2018.
Notice of Reasons for Rejection for Japanese Application No. 2014-051597, dated Jul. 31, 2018.
Third Office Action for Chinese Application No. 201410098327.7, dated Sep. 30, 2018.
Zhu et al., "Localization Optimization Algorithm of Maximum Likelihood Estimation Based on Received Signal Strength," IEEE 9th International Conference on Communication Software and Networks (ICCSN), pp. 830-834 (2017).
Examination Report for Application No. EP 17157505.3, dated Sep. 6, 2019.
Examination Report for Application No. GB1403406.0, dated Mar. 26, 2020.
Examination Report for Application No. GB1403407.8, dated Feb. 24, 2020.
Examination Report for Application No. GB1403408.6, dated Mar. 26, 2020.
Examination Report for Application No. GB1403480.5, dated Mar. 27, 2020.
Examination Report for Application No. GB1517038.4, dated Mar. 10, 2020.
Examination Report for Application No. GB1614666.4 dated Jan. 6, 2020.
Notice of Reasons for Refusal for Japanese Application No. 2017-518462, dated Mar. 10, 2020.
Notice of Reasons for Rejection for Japanese Application No. 2014-048410, dated Jan. 14, 2020.
Notice of Reasons for Rejection for Japanese Application No. 2015-198446, dated Dec. 17, 2019.
Notice of Reasons for Rejection for Japanese Application No. 2018-239741, dated Jan. 28, 2020.
Notice of Reasons for Rejection for Japanese Application No. 2019-002497, dated Nov. 25, 2019.
Notice of Reasons for Rejection for Japanese Application No. 2019-003424, dated Feb. 3, 2020.
Notice of Reasons for Rejection for Japanese Application No. 2019-003425, dated Feb. 3, 2020.
Notice of Reasons for Rejection for Japanese Application No. 2019-045165, dated Mar. 3, 2020.
Notification of Reexamination for Chinese Application No. 201410099103.8, dated Mar. 5, 2020.
Second Office Action for Chinese Application No. 201510640227.7, dated Nov. 26, 2019.
Decision of Refusal for Japanese Application No. 2014-041785, dated May 7, 2019.
Decision of Refusal for Japanese Application No. 2014-048411, dated Mar. 1, 2019.
Decision of Refusal for Japanese Application No. 2014-048412, dated Oct. 26, 2018.
Decision of Refusal for Japanese Application No. 2014-049920, dated Apr. 9, 2019.
Decision of Refusal for Japanese Application No. 2014-051597, dated Nov. 13, 2018.
Decision of Rejection for Chinese Application No. 201410097873.9, dated Dec. 5, 2018.
Decision of Rejection for Chinese Application No. 201410098326.2, dated Jul. 3, 2019.
Decision of Rejection for Chinese Application No. 201410098982.2, dated Jan. 23, 2019.
Examination Report for Application No. GB1402311.3, dated Aug. 6, 2019.
Examination Report for Application No. GB1403251.0, dated Oct. 10, 2019.
Examination Report for Application No. GB1403407.8, dated Dec. 2, 2019.
Examination Report for Application No. GB1403471.4, dated Nov. 15, 2019.
Examination Report for Application No. GB1403472.2, dated Nov. 19, 2019.
Examination Report for Application No. GB1403474.8, dated Dec. 3, 2019.
Examination Report for Application No. GB1403475.5, dated Nov. 12, 2019.
Examination Report for Application No. GB1403476.3, dated Nov. 4, 2019.
Examination Report for Application No. GB1403477.1, dated Nov. 7, 2019.
Examination Report for Application No. GB1403478.9, dated Nov. 21, 2019.
Examination Report for Application No. GB1403480.5, dated Oct. 24, 2019.
Examination Report for Application No. GB1403615.6, dated Nov. 20, 2019.
Examination Report for Application No. GB1403616.4, dated Nov. 15, 2019.
Examination Report for Application No. GB1403617.2, dated Nov. 28, 2019.
Examination Report for Application No. GB1901546.0, dated Aug. 6, 2019.
First Office Action for Chinese Application No. 201510640227.7, dated Mar. 15, 2019.
First Office Action for Chinese Application No. 201510640439.5, dated Feb. 25, 2019.
First Office Action for Chinese Application No. 201510641015.0, dated Feb. 27, 2019.
First Office Action for Chinese Application No. 201580054441.2, dated Feb. 27, 2019.
Fourth Office Action for Chinese Application No. 201410098327.7, dated Mar. 28, 2019.
Notice of Reasons for Rejection for Japanese Application No. 2014-048412, dated Nov. 26, 2019.
Notice of Reasons for Rejection for Japanese Application No. 2014-051114, dated Mar. 5, 2019.
Notice of Reasons for Rejection for Japanese Application No. 2014-051595, dated Dec. 10, 2019.
Notice of Reasons for Rejection for Japanese Application No. 2014-051596, dated Dec. 3, 2019.
Notice of Reasons for Rejection for Japanese Application No. 2014-051598, dated Jul. 30, 2019.
Notice of Reasons for Rejection for Japanese Application No. 2014-051598, dated Nov. 13, 2018.
Notice of Reasons for Rejection for Japanese Application No. 2015-015738, dated Jun. 18, 2019.
Notice of Reasons for Rejection for Japanese Application No. 2015-015738, dated Mar. 12, 2019.
Notice of Reasons for Rejection for Japanese Application No. 2015-052138, dated May 13, 2019.
Notice of Reasons for Rejection for Japanese Application No. 2015-052138, dated Nov. 5, 2019.
Notice of Reasons for Rejection for Japanese Application No. 2015-159015, dated Aug. 27, 2019.
Notice of Reasons for Rejection for Japanese Application No. 2015-159015, dated Mar. 19, 2019.
Notice of Reasons for Rejection for Japanese Application No. 2015-198444, dated Sep. 3, 2019.
Notice of Reasons for Rejection for Japanese Application No. 2015-198445, dated Aug. 27, 2019.
Notice of Reasons for Rejection for Japanese Application No. 2016-503431, dated Jan. 8, 2019.
Notice of Reasons for Rejection for Japanese Application No. 2016-557216, dated Dec. 10, 2019.
Notice of Reasons for Rejection for Japanese Application No. 2016-557216, dated May 14, 2019.

(56) References Cited

OTHER PUBLICATIONS

Notice of Reasons for Rejection for Japanese Application No. 2017-518462, dated Oct. 8, 2019.
Notice of Reasons for Rejection for Japanese Application No. 2018-017060, dated Oct. 15, 2019.
Notice of Reasons for Rejection for Japanese Application No. 2019-045165, dated Nov. 6, 2019.
Notification of Reexamination for Chinese Application No. 201410099103.8, dated Dec. 16, 2019.
Search Report for Application No. GB1503743.5, dated Apr. 25, 2019.
Second Office Action for Chinese Application No. 201510640439.5, dated Nov. 12, 2019.
Second Office Action for Chinese Application No. 201510641015.0, dated Nov. 8, 2019.
Second Office Action for Chinese Application No. 201580054441.2, dated Nov. 15, 2019.
Third Office Action for Chinese Application No. 201410098326.2, dated Jan. 17, 2019.
Third Office Action for Chinese Application No. 201410099068.X, dated Jan. 16, 2019.
Tomoyuki Tanabe, "Comparative evaluation of information dissemination methods for effective and efficient information sharing in wireless sensor networks," 2011 Research Report of the Information Processing Society of Japan [CD-ROM], Japan, Information Processing Society of Japan, Aug. 15, 2011.

* cited by examiner

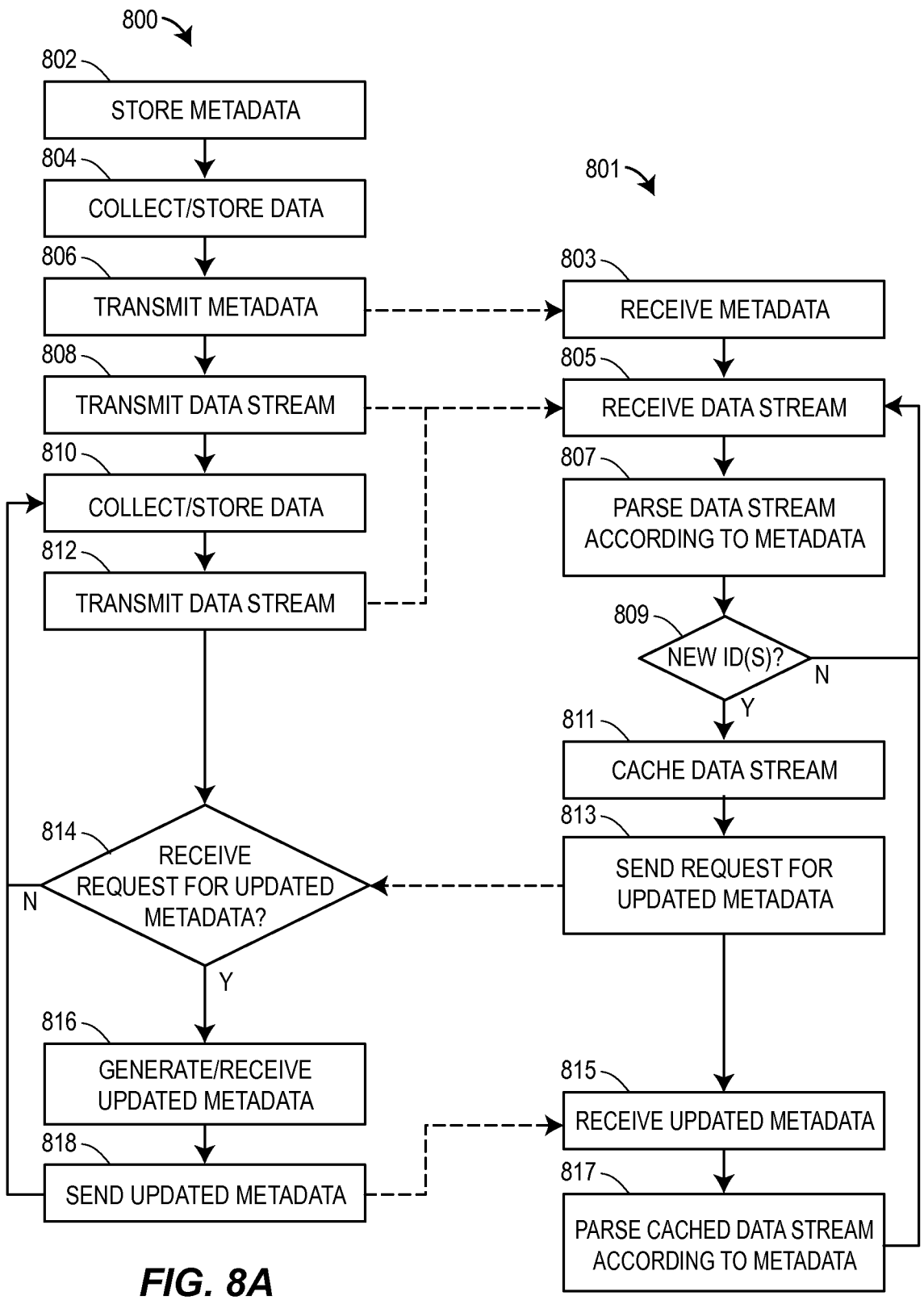

STREAMING DATA FOR ANALYTICS IN PROCESS CONTROL SYSTEMS

CROSS REFERENCE TO RELATED APPLICATIONS

The present disclosure is related to U.S. patent application Ser. No. 13/784,041, entitled "BIG DATA IN PROCESS CONTROL SYSTEMS" and filed Mar. 3, 2013; U.S. patent application Ser. No. 14/028,785, entitled "METHOD AND APPARATUS FOR CONTROLLING A PROCESS PLANT WITH LOCATION AWARE MOBILE CONTROL DEVICES" and filed on Sep. 17, 2013; U.S. patent application Ser. No. 14/174,413, entitled "COLLECTING AND DELIVERING DATA TO A BIG DATA MACHINE IN A PROCESS CONTROL SYSTEM" and filed Feb. 6, 2014; U.S. patent application Ser. No. 14/212,493, entitled "DISTRIBUTED BIG DATA IN A PROCESS CONTROL SYSTEM" and filed Mar. 14, 2014; and U.S. patent application Ser. No. 14/212,411, entitled "DETERMINING ASSOCIATIONS AND ALIGNMENTS OF PROCESS ELEMENTS AND MEASUREMENTS IN A PROCESS" and filed Mar. 14, 2014, the entire disclosures of each of which are hereby expressly incorporated by reference.

Additionally, the present disclosure is related to U.S. patent application Ser. No. 14/507,188, entitled "REGIONAL BIG DATA IN PROCESS CONTROL SYSTEMS" and filed concurrently herewith; U.S. patent application Ser. No. 14/873,721, entitled "DATA PIPELINE FOR PROCESS CONTROL SYSTEM ANALYTICS" and filed concurrently herewith; and U.S. patent application Ser. No. 14/507,252, entitled "AUTOMATIC SIGNAL PROCESSING-BASED LEARNING IN A PROCESS PLANT" and filed concurrently herewith, the entire disclosures of each of which are hereby expressly incorporated by reference.

TECHNICAL FIELD

The present disclosure relates generally to process plants and to process control systems, and more particularly, to streaming process control data between devices in or related to a process control plant on a continuous and/or as-needed basis.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. For example, the controllers and the field devices control at least a portion of a process being controlled by the process plant or system.

Information from the field devices and the controller is usually made available over a data highway or communication network to one or more other hardware devices, such as operator workstations, personal computers or computing devices, mobile computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In a process plant or process control system, data are generated and/or collected by field devices, controllers, sensors, function blocks, and the like. The generated and/or collected data may be stored in whole or in part, but generally are not available in real time throughout the process control system. Instead, data are stored and/or processed locally (e.g., in a function block, such as a statistical processing block, of a field device or controller) and the resulting processed data are cached locally and/or transmitted to controllers and/or historians to be stored for later analysis or review. In order to be useful for real-time analysis, for example to predict the future occurrence or present existence of an abnormal condition or a fault in the process control system, the data generated by the many various devices, sensors, function blocks, etc. in the process control system must be available for analysis by expert systems and, for example, by machine learning systems and analysis components such as those described in co-pending application Ser. No. 14/507,252, entitled "AUTOMATIC SIGNAL PROCESSING-BASED LEARNING IN A PROCESS PLANT," and filed concurrently. In current systems, transporting large volumes of data over a network within the process plant requires significant network bandwidth, and processing, storing, and cataloging such large volumes of data requires significant configuration for any device to be able to use the data.

Simply put, the architecture of currently known process control plants and process control systems is strongly influenced by limited controller and device memory, communications bandwidth, and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

The limitations of currently known process plants and process control systems discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain historical data for troubleshooting, manually feeding the data into stand-alone, off-line signal processing tools, and manually supervising the analysis of the output of the signal processing tools to generate updated models. Even then, the troubleshooting results and models may be incomplete or not fully representative of the actual system, as the inputs to their generation rely on a particular operator's experience and knowledge.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

Techniques, systems, apparatuses, and methods for streaming big data in a process plant are disclosed. Generally, said techniques, systems, apparatuses, and methods facilitate near real-time movement of data between data sources and data recipients, allowing data to be consumed and analyzed as soon as requested. Data are formatted into a predefined stream structure, and the structure communicated as metadata to the recipient before, and separately, from the data in the stream, reducing network overhead, required bandwidth, and transmission times, and increasing network throughput and storage efficiency. Metadata communicated to the recipient define identifiers associated with the streamed data. When the transmitter of a data stream is configured to include new or different data in the data stream, the transmitter sends new metadata to the recipient before sending the newly formatted data stream. The streamed data include module and block data, parameter data, alarm data, event data, and/or any data capable of being described by metadata. The communication of alarm and event data with the parameter data facilitates storage of the alarm and event data in the same location as the parameter data, which, in turn, facilitates more complex analyses of the relationships between all of the data.

A method for communicating data in a process control system includes storing a first set of metadata in a device operable to transmit a data stream and storing, in the device operable to transmit the data stream, a set of data for transmitting as the data stream. The method includes transmitting the first set of metadata to a device operable to receive the data stream, and receiving the first set of metadata at the device operable to receive the data stream. Further, the method includes transmitting the data stream to the device operable to receive the data stream, and receiving the data stream at the device operable to receive the data stream, after receiving the first set of metadata. The method also includes parsing the received data stream, at the device operable to receive the data stream, according to the first set of metadata. In various implementations, the first set of metadata includes stream format description metadata describing the structure of the data stream and/or data description metadata describing the content of the data stream.

In an implementation, the method also includes identifying in the data stream, at the device operable to receive the data stream, an identifier that is not in the first metadata, caching the data stream at the device operable to receive the data stream, sending a request, from the device operable to receive the data stream to the device operable to send the data stream, to provide an updated set of metadata, and receiving the request to provide the updated metadata at the device operable to send the data stream. The method also includes sending the updated set of metadata from the device operable to send the data stream to the device operable to receive the data stream, receiving, at the device operable to receive the data stream, the updated set of metadata, and parsing the cached data stream according to the updated set of metadata.

In another implementation, the method includes recognizing, in the device operable to send the data stream, a configuration change, updating the metadata according to the recognized configuration change, and sending the updated metadata from the device operable to send the data stream to the device operable to receive the data stream. The method further includes receiving, at the device operable to receive the data stream, the updated set of metadata, sending, from the device operable to send the data stream to the device operable to receive the data stream, the data stream. In the implementation, the data stream is structured according to the updated set of metadata, and parsing the data stream, in the device operable to receive the data stream, according to the updated set of metadata.

A method of streaming data in a process control system includes storing a first set of metadata in a device operable to transmit a data stream, collecting a set of data for transmitting as the data stream, buffering the set of collected data, and transmitting the first set of metadata to a device operable to receive the data stream. The method also includes transmitting the data stream to the device operable to receive the data stream. In the implementation, no further metadata are transmitted unless a trigger event causes the device operable to transmit the data stream to transmit additional metadata. In various implementations, the first set of metadata includes stream format description metadata describing the structure of the data stream and/or data description metadata describing the content of the data stream.

In an implementation of the method, the method also includes receiving a request for updated metadata, generating or downloading updated metadata, and sending updated metadata in response to the request for updated metadata. In another implementation of the method, the method includes recognizing a changed configuration parameter, generating or downloading updated metadata, and sending the updated metadata to the device operable to receive the data stream before sending a data stream according to the updated metadata.

A method for receiving a data stream in a process control system includes receiving a first set of metadata from a device operable to transmit the data stream, receiving the data stream after receiving the first set of metadata, parsing the received data stream according to the first set of metadata, and continuing to receive streamed data as long as the data stream can be parsed according to the first set of metadata. In an implementation of the method, the method also includes identifying in the data stream an ID that cannot be parsed according to the first set of metadata, caching the data stream, sending a request to the device operable to send the data stream to provide updated metadata, receiving the updated metadata, parsing the cached data stream according to the updated metadata, continuing to receive the data stream, and parsing the data stream according to the updated metadata. In another implementation of the method, the method also includes receiving updated metadata, continuing to receive the data stream, and parsing the data stream according to the updated metadata. In the implementation, the data stream received after the updated metadata can be parsed according to the updated metadata, and could not be parsed according to the first set of metadata.

An apparatus in a process control system includes a processor, a memory communicatively coupled to the processor and storing a set of metadata, and a data source providing data to the apparatus. The apparatus also includes a queuing routine executing on the processor to buffer data received from the data source and a data streaming routine executing on the processor and cooperating with a communication device. The data streaming routine is operable to transmit the stored set of metadata to a receiving device, assemble the buffered data into a data stream according to the stored set of metadata, and transmit the data stream to the receiving device.

In an implementation of the apparatus, the apparatus is a controller and the data source is an input receiving data from one or more process control devices. In the implementation, the apparatus also includes one or more routines executing on the processor to control the process according at least in part to the received data, and a collection routine executing on the processor and collecting data received from the one or more process control devices.

In an implementation of the apparatus, the data streaming routine executing on the processor is also operable to receive a request for updated metadata, generate or download updated metadata, and send the updated metadata in response to the request for updated metadata. In another implementation of the apparatus, the apparatus also includes a metadata updating routine operable to receive or generate updated metadata, and the data streaming routine executing on the processor is operable to send updated metadata in response to a detected change in a configuration of the apparatus or in response to the generation or reception of updated metadata, and continue sending the data stream. In the implementation, the data stream sent after the updated metadata are sent is structured according to the updated metadata.

An apparatus for receiving a stream of big data in a process control system includes a processor, a memory communicatively coupled to the processor, a non-transitory memory device for storing big data, and a receiver. The receiver operates to receive a set of metadata, receive a data stream, parse the data stream according to the set of metadata, process data according to the parsing, and continue to receive and process data as long as the data stream can be parsed according to the first set of metadata.

In an implementation of the apparatus, the apparatus is a big data appliance for storing big data, the non-transitory memory device comprises a high fidelity data storage device, and processing data comprises storing the data in the high fidelity data storage device.

In an implementation of the apparatus, the receiver is also operable to identify in the data stream an ID that cannot be parsed according to the set of metadata, cache the data stream, and send a request to provide updated metadata. The apparatus can receive the updated metadata, parse the cached data stream according to the updated metadata, and process the data according to the parsing. The apparatus can further continue to receive the data stream, parse the continued data stream according to the updated metadata, and process the data from the continued data stream.

In another implementation of the apparatus, the receiver is also operable to receive updated metadata, continue to receive the data stream, and parse the data stream according to the updated metadata. Therein, the data stream received after the updated metadata can be parsed according to the updated metadata, and could not be parsed according to the set of metadata.

BRIEF DESCRIPTION OF THE DRAWINGS

FIGS. 8A and 8B are flow charts respectively depicting a method for streaming data to another device and a method for receiving a data stream, and collectively depicting the flow of data between two devices operating according to the respective methods.

DETAILED DESCRIPTION

Figure 1:
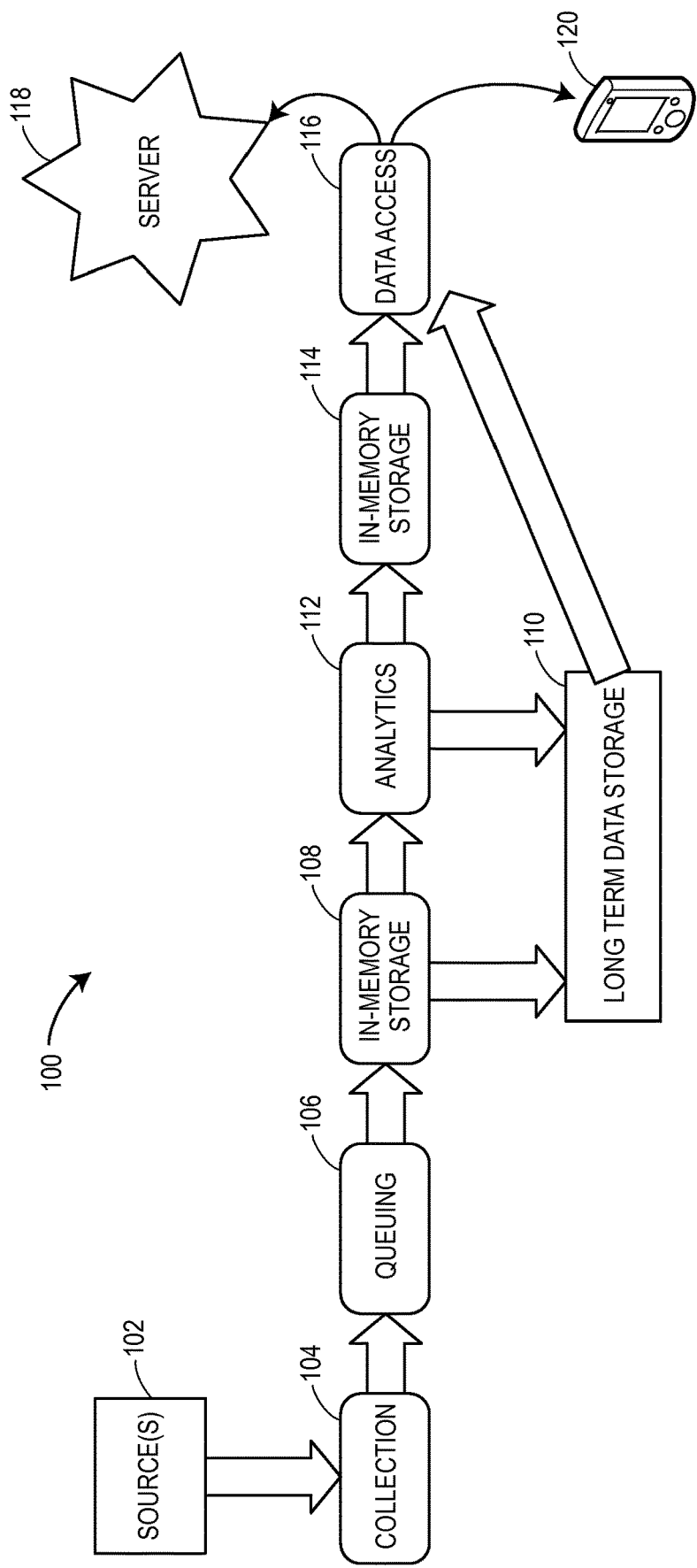
FIG. 1 is a block diagram of an example system for streaming process control data in a process plant or process control system.

Techniques, systems, and methods for streaming data and metadata in a process plant or process control system are disclosed herein. Generally, said techniques, systems, and methods facilitate movement of data between devices in or related to the process plant. More particularly, the techniques, systems, and methods facilitate streaming of various types of process control data, including I/O data, continuous data, event data, batch data, lab data, and data from analyzers and other components from and to various devices in the process plant, and to various mobile and/or external devices that may request such data. In fact, any data capable of being described by metadata may be streamed according to the data streaming techniques described herein. The techniques, systems, and methods additionally simply the control system to stream the data without requiring complex configuration of the receiving devices. The data can be streamed in real time or on request. That is, in contrast with known process control signal processing techniques in which a requesting device (or user) obtains a historical signal feed from a process plant a posteriori and which requesting device must be configured to receive precisely the data that will be transmitted to it, the present techniques, systems, and methods allow data to be streamed in real time to historians, requesting devices, or other process control devices actively using the data to control the process plant. Thus, by using the techniques, systems, and methods disclosed herein, signal processing may be incorporated or integrated into operating, on-line process plants or systems (e.g., by positioning or locating various signal processing functions near to various signal sources within the process plant or system), a priori configuration requirements are reduced, and real-time analytics and learning may be implemented. Other additional advantages will be apparent to those reading the following disclosure.

As an example of an embodiment described herein in greater detail, data may be produced by various devices and systems (e.g., DCS systems, process control field devices, etc.) and collected via I/O devices, buses, wireless gateways, and the like. The collected data may be queued and streamed to long term data storage devices (e.g., historian devices), to one or more analytics devices performing real-time analysis and/or learning functions, to one or more requesting devices, and/or to one or more devices performing process control using the streamed data as input. Additionally, the collected data may be streamed, directly or from one of the long term data storage devices, to external devices via a web server, an API, etc.

Metadata of the collected and streamed data may be streamed separately from the streamed data. The metadata are generally transmitted in the stream prior to the data and, in any event, are transmitted to the receiving device before the receiving device may process and/or use the streamed data. The metadata describe the type and organization of the data in the data stream and include, for example, module tag, block names, parameter names, plant area, unit and cell information, in addition to information that defines the stream format such as the identifiers that will indicate the beginning of a particular piece of data.

These and other techniques, systems, and methods for streaming data in a process control system or plant are discussed in more detail below. It should be expressly noted that, while various descriptions below describe the collection of process control data for storage in a big data historian device, the data streaming techniques described herein apply to any type of data in a process control system, including lab data, operations data, maintenance data, batch data, event data, alarm data, analysis data, statistical data, etc., so long as the data being streamed can be described by metadata. Additionally, the techniques are applicable to streaming of data between any devices, and is not limited to data streaming between controllers and big data nodes, between process control devices and controllers, or between process control devices and big data nodes. Any process control devices, big data nodes, big data appliances, analytics modules, controllers, workstations, I/O devices, routers, access points, etc., mobile platforms (e.g., smart phones, tablet computers, laptop computers, etc.) in or associated with a process plant (e.g., communicatively connected to the process plant) may be receiver of a data stream, a transmitter of a data stream, or both.

FIG. 1 illustrates by way of block diagram an example system 100 for streaming process control data in a process plant or process control system. As shown in FIG. 1, the example system 100 includes various sources 102 generating process control data. The sources 102 can include, by way of example, sensors and transmitters; field devices such as valves, actuators, mixers, pumps, etc.; controllers such as those found in a distributed control system (DCS); function blocks operating at any place in the process plant (including within field devices or controllers) to, for instance, receive a parameter or variable and perform a function or operation on the parameter or variable to produce an output; operator or other control/command inputs; I/O devices; communication gateways; or any other source in the process plant. Most generally, the sources 102 include one or more process elements and/or other components or functions corresponding to the process plant or process control system. For example, a source 102 may correspond to an input signal or an output signal of a process control device (e.g., of a controller, field device, or input/output (I/O) device). Additionally or alternatively, a source 102 may be a process variable such as a control variable, a manipulated variable, a disturbance variable, etc. (which may be an input or an output of a process control device). In some cases, the source 102 is a measurement. Examples of measurements may include a process measurement that is directly performed by a field device on some parameter of the process, or that is derived from such a direct measurement; an environmental measurement that is generally independent of control of the process (e.g., an ambient temperature or air pressure, a composition of a raw input material, etc.); a performance measurement (e.g., a process plant communication link bandwidth or delay, a composition of the output of the process plant, etc.), or some other measurement associated with the process plant controlling the process. In some cases, the source 102 is a parameter that is indicative of a balance of mass or a balance of energy within a portion of the process or process plant. In some cases, the source 102 corresponds to an output of another analytics system or module. It is noted that while a data may relate to multiple sources 102 (for example, may reflect the changing output value of an analysis that is being performed on an output of a controller), for ease of readability, the "source" is referred to herein in the singular tense.

Generally, data may correspond to any parameter or set of parameters that is associated with the process plant and that has a value that varies as a direct or indirect result of the process plant controlling the process, e.g., that varies in real-time or that varies as a direct or indirect result of the process plant (or the portion thereof with which the parameter is associated) is operating on-line.

The data are collected by a data collection block 104. The collection block 104 receives the data from one or more of the sources 102. While depicted in FIG. 1 as a single data collection block 104, there may be multiple data collection blocks 104. Each data collection block 104 may correspond to a single source 102, a discrete set of sources 102, or overlapping sets of sources 102. In an embodiment, the collection block 104 and the source 102 are integral. For example, the collection block 104 may be included in a controller or in a field device such as a valve or sensor. In another embodiment, the collection block 104 may be separate from but communicatively connected to the source 102. For instance, the collection block 104 may be physically attached or coupled to the source 102 so that the output of the source 102 traverses the collection block 104 prior to being processed by other blocks, or the collection block 104 may monitor the network link over which the output of the source 102 is transmitted. For example, the collection block 104 may be included in an adjunct device that is coupled to a controller, a field device, or a communication link via which the controller and/or the field device transmits signals.

The collection block 104 may passively or actively receive or obtain the data from the source 102. For example, when a controller directly sends its output to the collection block 104 (e.g., when the collection block 104 is attached to the output port of the controller, or the controller explicitly addresses its output to be delivered to the collection block 104), the collection block 104 passively obtains the output signal of the source 102. On the other hand, when the collection block 104 monitors the link on which the output of the controller is transmitted, the collection block 104 actively obtains the output signal of the source 102.

Collected data are queued in a queuing block 106. The data are queued a triggering event causes the queued data to be transmitted. In various embodiments, or in different instances in the same embodiment, the triggering event that causes the queuing block 106 to transmit queued data may be: a full queue, the expiration of a time-to-send timer, or a client request (e.g., from another device) to send the data.

Once the triggering event causes the queuing block 106 to transmit the collected data, the data are transmitted to a receiving device. The receiving device may be any number of devices, but generally include a big data node, as described below with reference to FIG. 2. The data received by the receiving device are generally stored in memory storage 108 of the receiving device, until further processing or storage occurs. In some embodiments, for example, the data are transferred from in-memory storage 108 of the receiving device to long term data storage 110. The long term data storage 110 may include a big data appliance as described in detail below. In any event, either alternatively or additionally, the data received by the receiving device are transmitted from in-memory storage 108 to an analytics block 112.

The data may be processed by the analytics block 112 to, by way of example, generate alarms and/or event messages, predictions, and/or recommendations, and/or to provide fault detection for the process plant or for a portion of a process plant. In some embodiments, the analytics block 112 receives or obtains one or more other inputs in conjunction with the data. For example, the analytics block 112 may receive multiple, time-varying input signals from multiple respective sources 102 via multiple collection blocks 104 and/or queuing blocks 106. In some situations, the analytics block 112 receives, in conjunction with the data, one or more additional real-time inputs that are relatively constant over time, such as a setpoint of a control variable or an indication of a static condition within the process plant. In some situations, the analytics block 112 receives, in conjunction with the data (and with any additional real-time inputs, if present), one or more other inputs that are not generated during real-time operations of the process plant, such as measurements that were obtained while the process plant or portion thereof was off-line, an output generated by an off-line, manual analytics tool, data obtained from a model of one or more portions of the process, etc.

In FIG. 1, the analytics block 112 operates on the data (and any other additional constant or varying inputs, if present) to determine one or more characteristics of the data or one or more operating characteristics of the process plant. The analytics block 112 may, for example, generate additional data, such as statistical data, related to the data received from the collection and queuing blocks 104 and 106. The analytics block 112 may also or alternatively generate information about the state of the process plant or a portion of the process plant, including alarms and event data, prediction data, recommendations, and fault detection/prediction data.

Indeed, the analytics block 112 automatically or autonomously performs one or more processing functions on the data to determine one or more characteristics of the data. For example, where the data include specific signals (e.g., time-varying signals such as a parameter value) the analytics block 112 may perform filtering, magnitude or amplitude analysis, power analysis, intensity analysis, phase analysis, frequency analysis, spectrum or spectral analysis, correlation analysis, convolution, smoothing, Hilbert transformation, level detection, linear signal processing, non-linear signal processing, and/or any other signal processing technique on the signal within the data. Thus, it follows that the one or more characteristics that are determined by the analytics block 112 correspond to the set of processing techniques that have been applied by the analytics block 112 to the signal or signals within the data. For example, if the analytics block 112 performs spectrum analysis on a signal within the data, the one or more corresponding characteristics of the signal within the data that are determined from the spectrum analysis may include an identification of one or more dominant frequencies within the signal, one or more n-th order frequencies (where n is an integer greater than one), a harmonic, a subharmonic, a bifurcation, bandwidth, distortion, etc. In another example, if the analytics block 112 performs a phase analysis on a signal within the data, the one or more corresponding characteristics of the signal may include an identification of one or more phases of the signal and/or of the presence or absence of any phase shifting. It is noted that while the above spectrum and phase analysis examples illustrate characteristics of one or more repetitive behaviors (e.g., oscillatory or periodic behaviors) that are included in the signal, the analytics block 112 may additionally or alternatively operate on the signal and/or the data to determine any non-repetitive behaviors are present, such as maximum and minimum amplitude over time, impulse responses, etc. In an embodiment, the analytics block 112 may select one or more functions to perform on the data, e.g., based on the source of the data, additional inputs, one or more previously determined characteristics of the data or of a signal in the data, and/or some other criteria.

The analytics block 112 may also be configured to determine the potential source or sources of the determined characteristics of the signal and/or of the data, e.g., the analytics block 112 may determine the "characteristic source." Specifically, the analytics block 112 may determine a set of process elements that are upstream of the source(s) 102, and identify which of those upstream sources 102 have the most significant impact on the variations in the behavior of the signal and/or data. Additional functionality of the analytics block 112 is described, for example, in co-pending application Ser. No. 14/507,252.

Regardless of the nature of the output generated by the analytics block 112, the output of the analytics block 112 may be stored in the long term data storage 110 for post-processing, and/or may be stored temporarily in memory storage 114 before, in some embodiments, being made available to a data access block 116. The data access block 116 may be a server (not shown), an Application Program Interface (API), or the like, that makes some or all of the data in the in-memory storage 114 and/or the long term data storage 110 available to other clients and applications. The data access block 116 may provide the data to a server 118 to be accessed by one or more devices over a network (not shown) or may provide the data directly to a specific device 120 according to a request from the device 120 or according to some predetermined scheme.

Generally, as referred to herein and as previously discussed, the term "upstream source" refers to a process element, a piece of equipment, or an asset of the process plant that is involved during run-time in causing the process plant to control the process. As used herein, the term "upstream" refers to having an earlier, active participation in or presence during control of the process in real-time, and the term "downstream" refers to having a later, active participation in or presence during control of the process in real-time. For example, a vat that stores raw material for input into the process is upstream of a boiler that heats the raw material, and is upstream of a temperature sensor that measures the temperature of the boiler. The term "process element," as used herein, generally refers to a physical or logical element that is used to the control of the process or a portion thereof, such as a process control device, a process variable, a measurement, and the like. Thus, using the vat and boiler example, a valve to release the raw material into the boiler is an upstream process element, the temperature sensor is a process element that is downstream of the valve, and another valve to release the heated flow into a pipe for delivery to another piece of equipment is a process element that is downstream of both the first valve and the temperature sensor.

A "piece of equipment," "equipment piece," or "equipment," as used interchangeably herein, generally refers to a physical element or component which may or may not be directly utilized during control of the process or portion thereof, but nonetheless may be ordered with other equipment pieces and/or process elements with respect to the control or flow of the process. To continue with the above example, the vat and physical supports for the vat are elements that are upstream of the boiler, and the boiler and the supports for the boiler are upstream of the piping that exits the boiler. An "asset" of a process plant, as referred to herein, may be any element corresponding to the process plant having a cost to the provider and/or operator of the process plant. For example, assets of a process plant may include instrumentation, valves, controllers, distributed control systems (DCSs), software, infrastructure, networks, control strategies, applications, configurations, piping, test equipment, configuration equipment, workstations, user interface devices, data storage entities, and the like. Returning again to the vat and boiler example, the vat, boiler, valves, piping, temperature sensor and corresponding supports are assets of the process plant, as are the control modules and strategies that use the valves and temperature sensor to control the heating and the amount of the material in the boiler, as is a portable diagnostic device used to diagnose fault conditions in the vat and/or boiler.

Any or all of the systems, methods, and techniques disclosed herein may be utilized in any process plant or process control system that is configured to control a process in real-time. Typically, the process is controlled to manufacture, refine, transform, generate, or produce physical materials or products. The process plant may include, for example, one or more wired communication networks and/ or one or more wireless communication networks. Similarly, the process plant may include therein one or more wired process elements and/or one or more wireless process elements. The process plant may include centralized databases, such as continuous, batch and other types of historian databases.

The process plants in which at least portions of the data streaming systems, methods, and techniques disclosed herein are utilized include a process control big data network and process control big data network nodes or devices. For example, at least some of the systems, methods, and techniques disclosed herein may be implemented in a process plant that supports localized, regional, and/or centralized big data, such as described in aforementioned U.S. application Ser. No. 13/784,041, in aforementioned U.S. patent application Ser. No. 14/174,413, in aforementioned U.S. application Ser. No. 14/212,493, and/or in aforementioned U.S. application Ser. No. 14/507,188, entitled "REGIONAL BIG DATA IN PROCESS CONTROL SYSTEMS." As such, a process plant that utilizes the data streaming techniques, methods, and systems described herein may include one or more big data devices, at least some of which includes a respective distributed or embedded big data appliance to operate on big data generated by a big data provider node.

Figure 2:
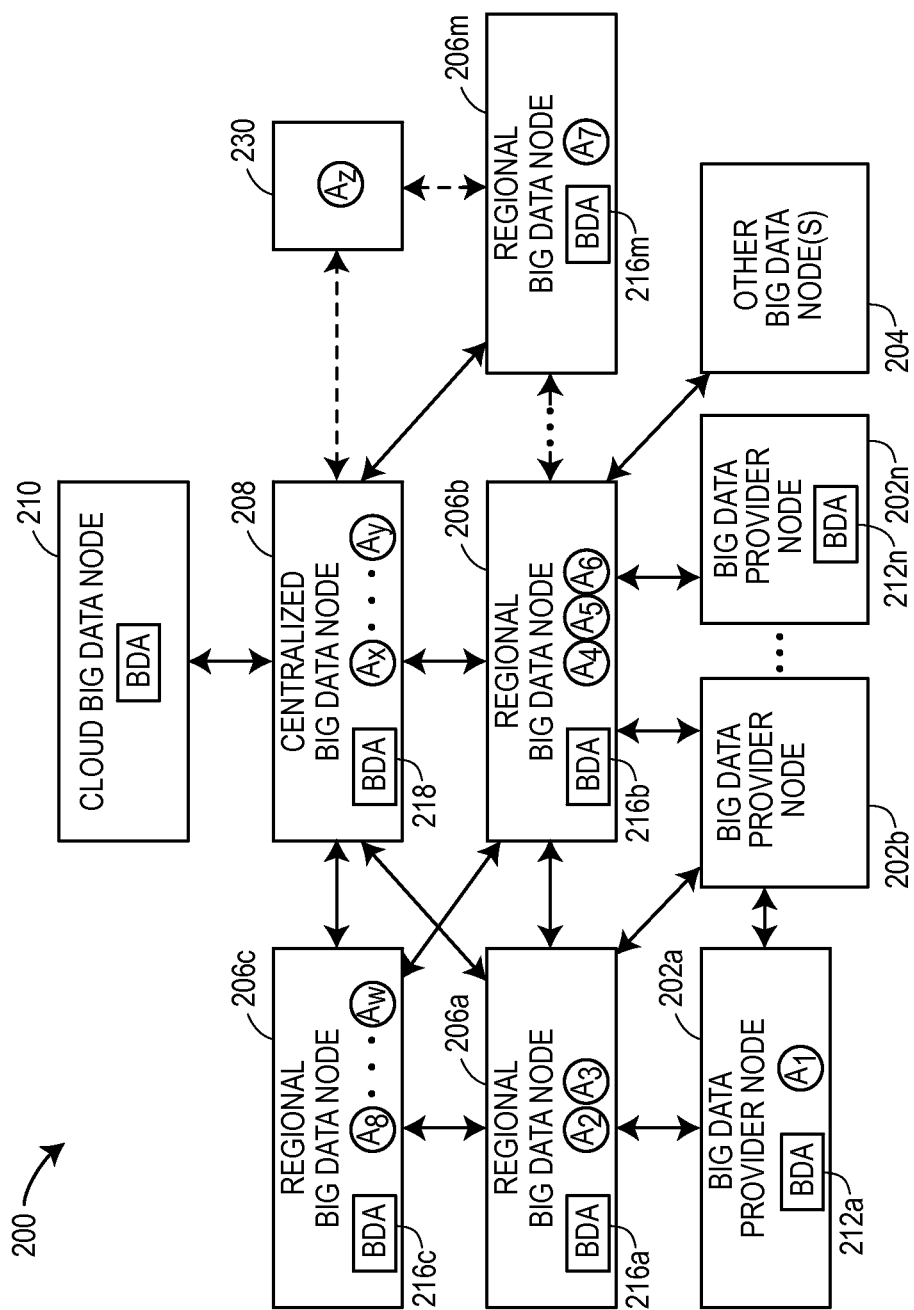
FIG. 2 is a block diagram of an example big data network for a process plant or process control system which may support streaming of big data between devices.

FIG. 2 is a simplified block diagram of an example big data network 200 for a process plant or process control system that controls one or more processes and that supports process control big data and, in particular, that may operate in accordance with the data streaming principles illustrated in FIG. 1. The process control big data network 200 includes one or more process control big data nodes 202-210, each of which collects, observes, generates, stores, analyzes, accesses, transmits, receives, and/or operates on process control big data. The terms "process control big data," "process big data," and "big data," as used interchangeably herein, generally refer to all (or almost all) data that is generated, received, and/or observed by devices included in and associated with the process control system or plant. In an embodiment, all data that is generated by, created by, received at, or otherwise observed by all devices included in and associated with the process plant is collected and stored as big data within the process control big data network 200.

The example process control big data network 200 includes one or more different types of process control big data nodes or devices 202-210, each of which collects, observes, generates, stores, analyzes, accesses, transmits, receives, and/or operates on process control big data generated from or based on the control of the one or more processes by the process plant or process control system. Each process control big data node or device 202-210 is connected to a process control system big data network backbone (not shown), and may use the backbone to communicate with one or more other process control big data nodes, for example, using the data streaming principles described herein. Accordingly, the process control big data network 200 comprises the process control system big data network backbone and the process control big data nodes 202-210 that are communicatively connected thereto. In an example, the process control big data network 200 includes a plurality of networked computing devices or switches that are configured to route packets to/from various other devices, switches or nodes of the network 200 via the backbone.

The process control big data network backbone comprises any number of wired communication links and any number of wireless communication links that support one or more suitable routing protocols, including at least a protocol to support streaming of big data as described herein. In addition to the protocol to support streaming of big data as described herein, the process control big data network backbone may support other protocols including, for example, protocols included in the Internet Protocol (IP) suite (e.g., UPD (User Datagram Protocol), TCP (Transmission Control Protocol), Ethernet, etc.), a streaming protocol such as the Stream Control Transmission Protocol (SCTP) and/or another suitable streaming protocol to stream (e.g., transport) data between process control big data nodes, or other suitable routing protocols. Typically, each node included in the process data big data network 200 may support at least an application layer (and, for some nodes, additional layers) of the routing protocol(s) supported by the backbone. In an embodiment, each process control big data node 202-210 is uniquely identified within the process control system big data network 200, e.g., by a unique network address.

In an embodiment, at least a portion of the process control system big data network 200 is an ad-hoc network. As such, at least some of the nodes 202-210 (and/or one or more other nodes, such as a user interface device 230) may connect to the network backbone (or to another node of the network 200) in an ad-hoc manner.

As FIG. 2 is a simplified diagram that depicts communicative connections between various big data nodes 202-210 in the process control big data network 200, the process control network backbone is not explicitly illustrated in FIG. 2. However, an example of such a backbone which may be utilized with any or all of the techniques described herein is described in aforementioned U.S. patent application Ser. No. 13/784,041. Of course, any or all of the techniques described herein are not limited to being utilized with the backbone described in U.S. patent application Ser. No. 13/784,041, but may be utilized with any suitable communication network backbone.

Turning now to the different types of process control big data nodes or devices 202-210, generally, a process control big data node of the network 200 may be a "big data provider" and/or may include a "big data appliance," as is discussed below.

The terms "big data provider," "big data provider node," or "provider node," as used interchangeably herein, generally refer to a process control big data node that collects, generates, observes, and/or forwards process control related big data using the process control big data network 200. The process control big data that is generated, collected, observed, and/or forwarded by provider nodes may include data that have been directly utilized in or generated from controlling a process within the plant, e.g., first-order real-time and configuration data that are generated or used by process control devices such as controllers, input/output (I/O) devices, and field devices. Additionally or alternatively, process control big data provider nodes may generate, collect, observe, and/or forward data related to delivering and routing such first-order process control data and other data within the process plant, e.g., data related to network control of the big data network 200 and/or of other communication networks in the plant, data indicative of bandwidth, network access attempts, diagnostic data, etc. Further, some process control big data provider nodes may generate, collect, observe, and/or forward data indicative of results, learning, and/or information that has been learned within the process control big data network 200 by analyzing process control big data that it has collected. Typically, such analytics results, learning, and/or learned information are generated from automatic, autonomous analytics performed by one or more process control big data nodes.

In most cases, a big data provider node includes multi-core hardware (e.g., multi-core processors) for transmitting and receiving big data in real-time (e.g., streamed) and, in some embodiments, for caching the real-time big data in preparation for streaming or other delivery over the process control big data network 200. A big data provider node may, in some embodiments, also include high-density memory for the caching of the real-time big data. Examples of real-time data that may be transmitted, received, streamed, cached, collected, and/or otherwise observed by big data provider nodes may include process control data such as measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data. In some embodiments, a big data provider node does not cache at least some of the real-time big data that it observes, but instead streams the un-cached data to one or more other big data nodes as the data is observed, received, or generated at the node. Examples of big data provider nodes which may be utilized with any or all of the techniques described herein may be found in aforementioned U.S. patent application Ser. Nos. 13/784,041, 14/174,413, and 14/212,493. Of course, any or all of the techniques described herein may be alternatively or additionally utilized with big data provider nodes other than those described in U.S. application Ser. Nos. 13/784,041, 14/174,413, and 14/212,493.

On the other hand, the terms "big data appliance," "big data appliance node," or "appliance node," as used interchangeably herein, generally refer to a process control big data node that receives, stores, retrieves, and analyzes process control big data. As such, a process control big data appliance (or "BDA") generally operates on big data that has been generated or provided by one or more process control big data provider nodes. In some cases, a big data appliance is included in a big data provider node, or is integrally co-resident with a big data provider within a same node or device. In such cases, the big data appliance is referred to as an "embedded big data appliance," as the appliance is embedded in the provider node or device and operates on the big data that has been received, collected, or generated by the co-resident big data provider. In an example, an embedded big data appliance analyzes big data that has been locally generated and/or provided by the big data provider node on which the embedded big data appliance resides to discover or learn knowledge. This learned knowledge may be stored at the embedded big data appliance, operated on locally by the embedded big data appliance, and/or provided as big data to other big data nodes. Any or all of the techniques described herein may be utilized in conjunction with embedded big data appliances such as described in aforementioned U.S. patent application Ser. No. 14/212,493 and/or in U.S. patent application Ser. No. 14/507,188, entitled "REGIONAL BIG DATA IN PROCESS CONTROL SYSTEMS", for example, although other suitable embedded big data appliances may additionally or alternatively utilized. Further, it is noted that in embodiments in which a big data provider node includes an embedded big data appliance, the cache of the big data provider node may be reduced in size or omitted, as the embedded big data appliance provides local data storage capabilities.

In some cases, a big data appliance may be a stand-alone big data node of the process control big data network 200. That is, in these cases, a big data appliance is not embedded in or co-resident with a big data provider node. Thus, a process control big data node that includes a big data appliance may not necessarily itself be a provider of big data.

Figure 3:
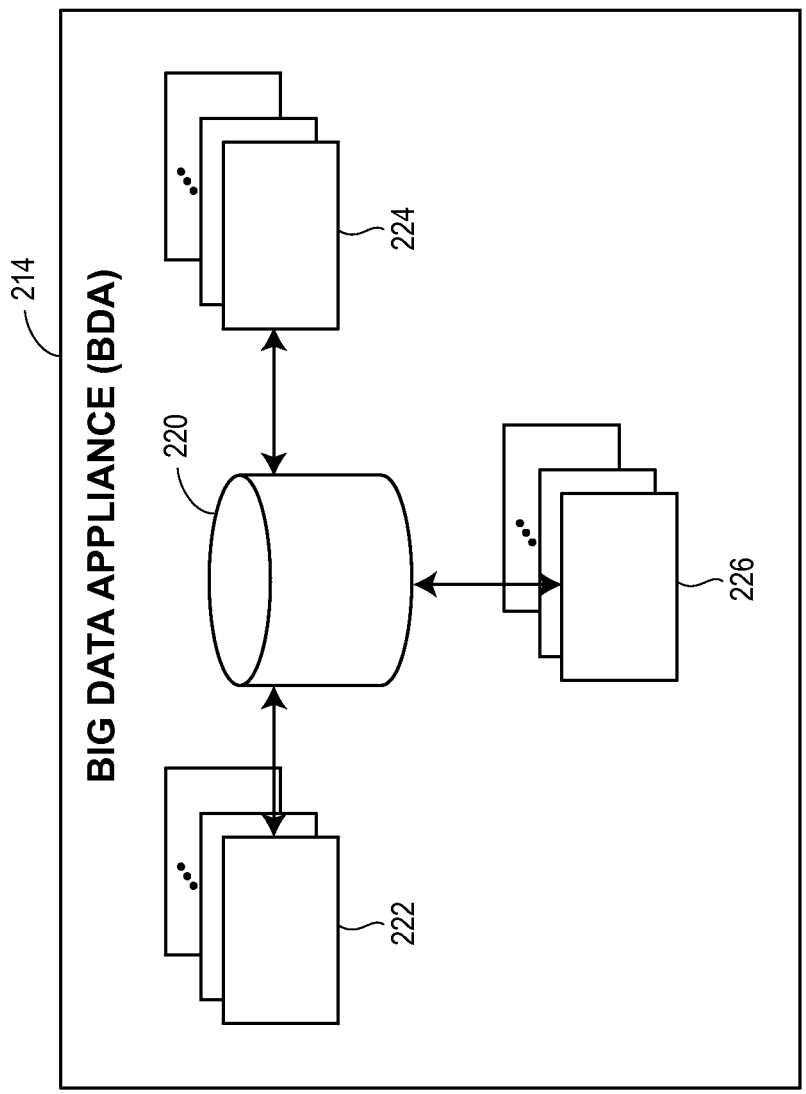
FIG. 3 is a block diagram of an example big data appliance.

FIG. 3 depicts a simplified block diagram of an example big data appliance 214, instances of which may be included in the process control big data network 200 of FIG. 2. Referring to FIG. 3, the example big data appliance 214 includes a big data storage area 220 for historizing or storing received big data, one or more big data appliance receivers 222, and one or more big data appliance request servicers 224. Each of the big data appliance receivers 222 is configured to receive big data packets (which may be streamed from another node and/or may be generated by a big data provider node on which the appliance 214 resides), process the data packets to retrieve the substantive data and time-stamp carried therein, and store the substantive data and timestamp in the big data storage area 220 of the appliance 214, e.g., as time-series data and optionally also as metadata.

The big data storage area 220 may comprise multiple local and/or remote physical data drives or storage entities, such as RAID (Redundant Array of Independent Disks) storage, solid-state storage, cloud storage, high-density data storage, and/or any other suitable data storage technology that is suitable for data bank or data center storage, and that has the appearance of a single or unitary logical data storage area or entity to other nodes. Further, each of the big data appliance request servicers 224 is configured to access time-series data and/or metadata stored in the big data appliance storage area 220, e.g., per the request of a requesting entity or application.

In some instances, a big data appliance 214 includes one or more big data analyzers 226 to perform respective data analytics and/or learning on at least parts of the stored big data, typically in an automatic and/or autonomous manner without using any user input to initiate and/or perform the learning analysis, as described in U.S. patent application Ser. No. 14/507,252, entitled "AUTOMATIC SIGNAL PROCESSING-BASED LEARNING IN A PROCESS PLANT", for example. In an embodiment, the big data analyzers 226 individually and/or collectively perform large scale data analysis on the stored data (e.g., data mining, data discovery, etc.) to discover, detect, or learn new information or knowledge. For example, data mining generally involves the process of examining large quantities of data to extract new or previously unknown interesting data or patterns such as unusual records or multiple groups of data records. The big data analyzers 226 may additionally or alternatively perform large scale data analysis on the stored data (e.g., machine learning analysis, data modeling, pattern recognition, predictive analysis, correlation analysis, etc.) to predict, calculate, or identify implicit relationships or inferences within the stored data. In an embodiment, multiple big data analyzers 226 (and/or multiple instances of at least one big data analyzer 226) operate in parallel and/or cooperatively to analyze the data stored in the big data storage area 220 of the appliance 214. An example of cooperative data analytics which may be utilized with any or all of the techniques described herein is found in aforementioned U.S. application Ser. No. 14/873,721 entitled "DATA PIPELINE FOR PROCESS CONTROL SYSTEM ANALYTICS," and/or in aforementioned U.S. patent application Ser. No. 14/507,188 entitled "REGIONAL BIG DATA IN PROCESS CONTROL SYSTEMS," although any suitable cooperative data analytics technique or techniques may be utilized with any or all aspects of the present disclosure.

Typically, each of the big data appliance receivers 222, the big data appliance request servicers 224, and the big data analyzers 226 comprise respective computer-executable instructions stored on one or more non-transitory, tangible memories or data storage devices, and are executable by one or more processor to perform one or more their respective big data functions. In some embodiments, the big data analyzers 226 are not included in the big data appliance 214, but instead are in communicative connection with the big data appliance 214. For example, the big data appliance 214, including the storage area 220, receivers 222 and servicers 125 may be implemented by a first set of computer-executable instructions, and the big data analyzers 226 may be implemented by a second set of computer-executable instructions (which may or may not be stored on the same non-transitory, tangible memories or data storage devices as the first set of computer-executable instructions). Descriptions of various types of example big data appliances and their components which may be utilized with any or all of the techniques described herein may be found in aforementioned U.S. patent application Ser. Nos. 13/784,041, 14/174, 413, and 14/212,493, although it is understood that any or all of the techniques described herein may be utilized with other suitable big data appliances.

Referring again to FIG. 2, the process control big data network 200 may include process control big data provider nodes 202-210 that operate at various levels, tiers, or orders with respect to first-order or primary process related data that is directly generated, routed, and/or used by process control devices such as controllers, I/O devices, field devices, etc. At the lowest order, tier, or level, "local" big data provider nodes or devices 202a-202n that operate nearest to the process to collect, generate, observe, and/or forward primary process big data related to the input, operation, and output of process devices and equipment in the process plant. As such, "local big data provider nodes or devices" 202a-202n typically are nodes and/or devices that generate, route, and/or receive primary process control data to enable the one or more processes to be controlled in real-time in the process plant. Examples of local big data provider nodes 202a-202n include devices whose primary function is directed to generating and/or operating on process control data to control a process, e.g., wired and wireless field devices, controllers, and I/O devices. These process control devices may be communicatively connected to each other and/or to one or more process control communications networks in a distributed manner. For instance, one or more field devices are communicatively connected to one or more I/O devices, which in turn are communicatively connected to one or more controllers, which in turn are communicatively coupled to one or more process control communication networks (e.g., HART®, WirelessHART®, process control big data, FOUNDATION® Fieldbus, etc.).

Other examples of local big data provider nodes 202a-202n include devices whose primary function is to provide access to or routing of primary process data through one or more communications networks of the process control system (which may include the process control big data network 200 and/or other communication networks). Examples of such types of local big data provider nodes 202a-202n include access points, routers, interfaces to wired control busses, gateways to wireless communications networks, gateways to external networks or systems, and other such routing and networking devices. Still other examples of local big data provider nodes 202a-202n include devices, such as historian devices, that are configured to temporarily store big data throughout the process control system, e.g., as an overflow cache, way-station, or routing queue.

In some cases, a local big data provider node includes a respective local big data appliance, as illustrated in FIG. 2 by the nodes 202a, 202n that respectively include the embedded big data appliances 212a, 212n. Each local, embedded big data appliance 212a, 212n receives and stores respective local big data provided by its respective provider 202a, 202n. Further, in some local big data provider nodes, such as in the node 202a, one or more analytics functions, routines, operations, or processes (represented by the encircled $A_1$) may be performed on at least some of the local big data stored in the appliance 212a. In an embodiment, the analytics $A_1$ are performed by one or more of the big data analyzers 226 of FIG. 3. The learned information, learnings, and/or the results of the one or more analytics $A_1$ may also be stored in the local big data appliance 212a, and at least some of the learned information or results may be provided to another big data node 206a. For example, a local big data provider node that is included in or coupled to a controller that includes an instance of a signal processing module 102, the signal processing module 102 performs a frequency analysis or other signal-processing analysis on the output signal of the controller, and the local big data provider node transmits the results of the analysis to another big data node.

Some local provider nodes, e.g., as illustrated by the node 202n, include a respective local, embedded big data appliance 212n for local big data collection and historization, however, the resident appliance 212n performs minimal or no analytics. As such, the node 202n merely streams (or otherwise transmits, e.g., upon request or at suitable times) locally stored big data to another node 206b, e.g. for analytical processing or for further forwarding. Some local big data nodes, e.g., the node 202b, do not include any big data appliance at all. Such nodes 202b may stream, in real-time or with the aid of a cache, locally observed big data to one or more other big data nodes 202a, 206b.

Various types of real-time data, such as process-related data, plant-related data, and other types of data, may be cached, collected, stored, transmitted, and/or streamed as big data by the big data provider nodes or devices 202a-202n. Examples of process-related data include continuous, batch, measurement, and event data that are generated while a process is being controlled in the process plant (and, in some cases, are indicative of an effect of a real-time execution of the process). Further, process-related data may include process definitions, arrangement or set-up data such as configuration data and/or batch recipe data, data corresponding to the configuration, execution and results of process diagnostics, etc.

Plant-related data, such as data related to the process plant but that may not be generated by applications that directly configure, control, or diagnose a process in the process plant, may also cached, collected, stored, transmitted, and/or streamed by the big data provider nodes 202a-202n as big data. Examples of plant-related data include vibration data, steam trap data, data indicative of a value of a parameter corresponding to plant safety (e.g., corrosion data, gas detection data, etc.), data indicative of an event corresponding to plant safety, data corresponding to the health of machines, plant equipment and/or devices, data corresponding to the configuration, execution and results of equipment, machine, and/or device diagnostics, and data that is useful for diagnostics and prognostics.

Further, other types of data including data highway traffic and network management data related to the process control big data network backbone and of various communications networks of the process plant, user-related data such as data related to user traffic, login attempts, queries and instructions, text data (e.g., logs, operating procedures, manuals, etc.), spatial data (e.g., location-based data), and multimedia data (e.g., closed circuit TV, video clips, etc.) may be cached, collected, stored, transmitted, and/or streamed by the big data provider nodes 202a-202n as big data.

In some embodiments, dynamic measurement and control data may be automatically cached, collected, stored, transmitted, and/or streamed by the big data provider nodes 202a-202n as big data. Examples of dynamic measurement and control data include data specifying changes in a process operation, data specifying changes in operating parameters such as setpoints, records of process and hardware alarms and events such as downloads or communication failures, etc. In addition, static data such as controller configurations, batch recipes, alarms and events may be automatically collected by default when a change is detected or when a controller or other entity is initially added to the big data network 200.

Moreover, in some scenarios, at least some static metadata that describes or identifies dynamic control and measurement data is captured in the big data provider nodes 102a-202n when a change in the metadata is detected. For example, if a change is made in the controller configuration that impacts the measurement and control data in modules or units that must be sent by the controller, then an update of the associated metadata is automatically captured by the big data provider nodes 202a-202n. Additionally or alternatively, parameters associated with the special modules used for buffering data from external systems or sources (e.g., weather forecasts, public events, company decisions, etc.), surveillance data, and/or other types of monitoring data may be automatically captured by the big data provider nodes 202a-202n.

In some situations, added parameters created by end users are automatically captured in the big data provider nodes 202a-202n. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

Referring again to the network 200 of FIG. 2, at one or more levels or tiers above the local big data nodes 202a-202n, the process control big data network 200 may include one or more regional big data nodes 206a-206m. To implement regional big data, the process plant or process control system may be viewed as having a plurality of different areas or regions which may be delineated according to any desired manner such as geographical, physical, functional, logical, etc. In an illustrative but non-limiting example, a process plant may have a first region that receives raw materials and produces a first intermediate product, a second region that receives other raw materials and produces a second intermediate product, and a third region that receives the first and second intermediate products to produce an output product. Each of these three different example regions may be serviced by a respective "regional" big data node 206a, 206b, 206m to operate on big data produced by its respective region. Accordingly, a "regional big data node" provides big data support and services for data that is generated and/or provided by a respective grouping or region of local big data provider nodes 202 and, in some cases, by other big data provider nodes 204. Other big data provider nodes 204 may include, for example, big data nodes that are external to the region of the plant (e.g., a portable diagnostics device or an off-line simulator), user interface devices 230, or data sources that are external to the process plant altogether (e.g., a computing device of a materials supplier, a feed providing a weather forecast, etc.).

As shown in FIG. 2, a respective grouping or region serviced by a regional big data node 206a-206m may comprise one or more big data provider nodes 202a-202n and/or other big data nodes 204 that are related according to some geographical, physical, functional, logical, or other desired manner. For example, the regional big data node 206a services a region including the local big data provider nodes 202a and 202b, and the regional big data node 206b services a region including the local big data nodes 202b and 202n, as well as another big data node 204. The particular nodes 202, 204 included in a particular region may stream or deliver data to their respective regional big data node 206 for purposes of regional big data storage, access, and/or analysis. Further, any of the big data provider nodes 202a-202n and/or the other big data nodes 204 may communicate with a particular regional big data node 206a-206m to request regionally available services and/or to access regional big data and metadata stored therein, whether such requesting nodes are included in the particular region of the particular regional big data node 206a-206m or not.

Accordingly, each regional big data node 206a-206m includes a respective regional big data appliance 216a-216m via which big data is received, stored as regional big data, and accessed or requested. Further, each regional big data node 206a-206m may include one or more analytics functions, routines, operations, or processes (e.g., $A_2$-$A_w$) that may individually and/or cooperatively operate on at least some of the regional big data, as generally described in co-pending U.S. patent application Ser. No. 14/507,252 entitled "AUTOMATIC SIGNAL PROCESSING-BASED LEARNING IN A PROCESS PLANT," and incorporated herein by reference.

Big data transmitted and/or received by any of the big data nodes may be streamed according to the methods disclosed herein. In particular, big data (and associated metadata) may be streamed from a first a big data node to a second big data node for one or more of historization, storage, and analysis. Likewise, big data (and associated metadata) may be streamed from a process device to a big data node, and/or from a big data node to a requesting device, such as, for example, a laptop, smartphone, tablet computer, or the like, requesting data via a network connection (e.g., via the Internet). Additionally, one or more of the big data nodes or requesting devices may be in the cloud (a "cloud node").

In some embodiments, a process plant includes one or more legacy process control devices (not shown) that do not inherently include any big data support. In these embodiments, a gateway node in the plant or an adjunct device directly coupled to a legacy device may convert or translate data messages between a protocol utilized by the legacy device and the protocol utilized by the process control big data network backbone, thereby communicatively connecting the legacy device and the process control big data network 200.

Typically, big data nodes or devices 202-210 do not have an integral user interface, although some of the big data nodes or devices 202-210 may have the capability to be in communicative connection with one or more user interface devices 230, e.g., by communicating over a wired or wireless communication link, or by plugging a user interface device 230 into a port of the big data nodes or devices 202-210. In FIG. 2, the user interface device 230 is depicted a big data node that is wirelessly connected to the process control big data network 200.

The user interface device 230 is a device (e.g., a mobile or stationary computing device, a workstation, a handheld device, a surface computing device, a tablet, etc.) that includes one or more integrated user interfaces via which a user or operator may interact with the device and the process control system or process plant to perform activities related to the process plant (e.g., configure, view, monitor, test, diagnose, order, plan, schedule, annotate, and/or other activities). Integrated user interfaces may include a screen, a keyboard, keypad, mouse, buttons, touch screen, touch pad, biometric interface, speakers and microphones, cameras, and/or any other user interface technology. The user interface devices 230 may include a direct wired and/or wireless connection to the process control system big data network backbone, or may include an indirect connection to the backbone, e.g., via an access point or a gateway. In some embodiments, a user interface device 230 may be a requesting device or may otherwise receive streamed big data.

Figure 4:
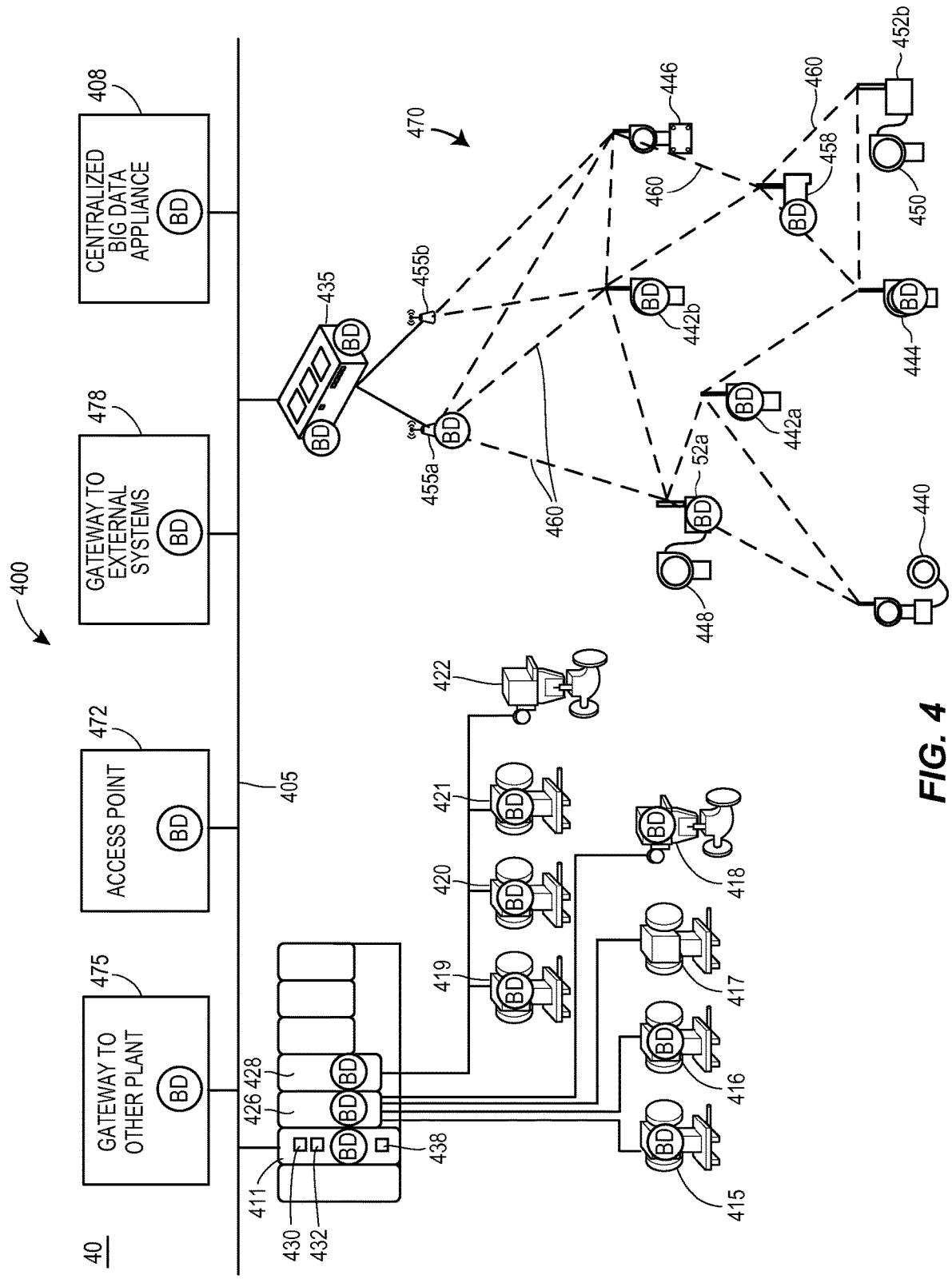
FIG. 4 is a block diagram of an example process plant or process control system in which data are streamed between devices in the process plant.

FIG. 4 is a block diagram including various example aspects of an example process plant or process control system 40 in which the data streaming techniques, methods, systems and apparatuses disclosed herein may be implemented and included. In an embodiment, at least a portion of the process plant 40 is supported by a process control big data network, such as the process control big data network 200 of FIG. 2. However, while the process plant 40 is described below with respect to features illustrated in FIGS. 2-3 for ease of discussion and not for limitation purposes, it is understood that the process plant 40 may utilize a process control big data network other than that described in FIG. 2, or the process plant 400 may omit any process control big data network, nodes, and/or devices.

In FIG. 4, process control big data nodes or devices are indicated by a "BD" reference that signifies that the node is a process control big data provider node, a big data appliance, or both. For example, nodes or devices indicated by a "BD" reference in FIG. 4 may be, referring to FIG. 2, a local big data provider node and/or appliance 202a-202n, 212a-212n, a regional big data provider node and/or appliance 206a-206m, 216a-216m, a centralized big data provider node 208 and/or appliance 218, or another type of big data node 204.

In FIG. 4, the process control big data nodes BD are nodes of a process control big data network 400. In an embodiment, the process control big data network 400 is the process control big data network 200 of FIG. 2, and the nodes BD are the nodes 202-208 of the network 200. In FIG. 4, the nodes BD are communicatively connected over the network 400 via a process control system big data network backbone 405. The backbone 405 includes a plurality of networked computing devices or switches that are configured to route packets to/from various process control big data nodes BD. The plurality of networked computing devices of the backbone 405 may be interconnected by any number of wireless and/or wired links, and the big data network backbone 405 may support one or more suitable routing protocols, such as a process control big data streaming protocol, as previously discussed with respect to the network 200.

As shown in FIG. 4, the process control big data network 400 includes a centralized big data appliance 408 and multiple other big data provider nodes 411, 415, 416, 418, 419, 420, 421, 426, 428,435, 442a, 442b, 444, 452a, 455a, 458, 472, 475, 478. One of the example big data provider nodes is a big data process controller device 411 that locally collects, analyzes and stores big data of the process control network or plant 40. The controller 411 is communicatively connected to wired field devices 415-422 via input/output (I/O) cards 426 and 428, and is communicatively connected to wireless field devices 440-446 via a wireless gateway 435 and the process control big data network backbone 405. (In another embodiment, though, the controller 411 may be communicatively connected to the wireless gateway 435 using a communications network other than the big data backbone 405, such as by using a process control communications network that includes any number of wired and/or wireless communication links.) In FIG. 4, the controller 411 is a big data provider node BD of the process control system big data network 400, and is directly connected to the process control big data network backbone 405.

The controller 411, which may be, by way of example, the DeltaV™ controller sold by Emerson Process Management, may operate to implement a batch process or a continuous process using at least some of the field devices 415-422 and 440-446. In an embodiment, in addition to being communicatively connected to the process control big data network backbone 405, the controller 411 may also be communicatively connected to at least some of the field devices 415-422 and 440-446 using any desired hardware, software, and/or communications links or networks associated with, for example, standard 4-20 mA devices, I/O cards 426, 428, and/or any smart communication protocol such as the FOUNDATION® Fieldbus protocol, the HART® protocol, the WirelessHART® protocol, etc. In an embodiment, the controller 411 may be communicatively connected with at least some of the field devices 415-422 and 440-446 using the process control big data network backbone 405. In FIG. 4, the controller 411, the field devices 415-422 and the I/O cards 426, 428 are wired devices, and the field devices 440-446 are wireless field devices. Of course, the wired field devices 415-422 and wireless field devices 440-446 could conform to any other desired standard(s) or protocols, such as any wired or wireless protocols, including any standards or protocols developed in the future.

The process controller device 411 includes a processor 430 that implements or oversees one or more process control routines (e.g., that are stored in a memory 432), which may include control loops. The processor 430 is configured to communicate with the field devices 415-422 and 440-446 and with other process control big data nodes BD that are communicatively connected to the backbone 405. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 40 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 411 may be configured to implement a control strategy or control routine in any desired manner.

In some embodiments, the controller 411 implements a control strategy using what are commonly referred to as function blocks, wherein each function block is an object or other part (e.g., a subroutine) of an overall control routine and operates in conjunction with other function blocks (via communications called links) to implement process control loops within the process control system 40. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 40. Of course, hybrid and other types of function blocks exist. Function blocks may be stored in and executed by the controller 411, which is typically the case when these function blocks are used for, or are associated with standard 4-20 ma devices and some types of smart field devices such as HART devices, or may be stored in and implemented by the field devices themselves, which can be the case with Fieldbus devices. The controller 411 may include one or more control routines 438 that may implement one or more control loops. Each control loop is typically referred to as a control module, and may be performed by executing one or more of the function blocks.

The wired devices 411-422 shown in FIG. 4 include big data wired process control devices 415, 416, and 418-421 and the I/O cards 426, 428. FIG. 4 also shows wired legacy devices 417 and 422, which may operate in conjunction with the wired big data devices 415, 418-421, 426, 428 within the process plant. The wired field devices 415-422 may be any types of devices, such as sensors, valves, transmitters, positioners, etc., while the I/O cards 426 and 428 may be any types of I/O devices conforming to any desired communication or controller protocol. In FIG. 4, the field devices 415-418 are standard 4-20 mA devices or HART devices that communicate over analog lines or combined analog and digital lines to the I/O card 426, while the field devices 419-422 are smart devices, such as FOUNDATION® Fieldbus field devices, that communicate over a digital bus to the I/O card 428 using a Fieldbus communications protocol. In some embodiments, though, at least some of the big data wired field devices 415, 416 and 418-421 and/or at least some of the big data I/O cards 426, 428 additionally or alternatively communicate with the controller 411 using the big data network backbone 405.

The wireless field devices 440-446 shown in FIG. 4 include examples of wireless big data nodes or devices BD (e.g., devices 442a, 442b, 444). FIG. 4 also includes an example of a legacy wireless device (e.g., device 446). The wireless field devices 440-446 communicate in a wireless network 470 using a wireless protocol, such as the WirelessHART protocol. Such wireless field devices 440-446 may directly communicate with one or more other big data devices or nodes BD of the process control big data network 400 that are also configured to communicate wirelessly (using a wireless streaming protocol, for example). To communicate with one or more other big data nodes that are not configured to communicate wirelessly, the wireless field devices 440-446 may utilize a wireless gateway 435 connected to the backbone 405 or to another process control communications network. Any number of wireless field devices that support big data may be utilized in the process plant 40.

The wireless gateway 435, as illustrated in FIG. 4, is another example of a big data node BD included in the process control plant or system 40, and provides access to/from the various wireless devices 440-458 of a wireless communications network 470. In particular, the wireless gateway 435 provides communicative coupling between the wireless devices 440-458, the wired devices 411-428, and/or other nodes or devices of the process control big data network 400 (including the controller 411 of FIG. 4). For example, the wireless gateway 435 may provide communicative coupling by using the big data network backbone 405 and/or by using one or more other communications networks of the process plant 40.

The wireless gateway 435 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 435 may translate commands between wired and wireless protocols that do not share any protocol layers. In addition to protocol and command conversion, the wireless gateway 435 may provide synchronized clocking used by time slots and superframes (sets of communication time slots spaced equally in time) of a scheduling scheme associated with the wireless protocol implemented in the wireless network 470. Furthermore, the wireless gateway 435 may provide network management and administrative functions for the wireless network 470, such as resource management, performance adjustments, network fault mitigation, monitoring traffic, security, and the like.

Similar to the wired field devices 415-422, the wireless field devices 440-446 of the wireless network 470 may perform physical control functions within the process plant 40, e.g., opening or closing valves or take measurements of process parameters. The wireless field devices 440-446, however, are configured to communicate using the wireless protocol of the network 470. As such, the wireless field devices 440-446, the wireless gateway 435, and other wireless nodes 452-458 of the wireless network 470 are producers and consumers of wireless communication packets.

In some scenarios, the wireless network 470 may include non-wireless devices, which may or may not be big data devices. For example, a field device 448 of FIG. 4 may be a legacy 4-20 mA device and a field device 450 may be a traditional wired HART device. To communicate within the network 470, the field devices 448 and 450 may be connected to the wireless communications network 470 via a wireless adaptor (WA) 452a or 452b. In FIG. 4, the wireless adaptor 452b is shown as being a legacy wireless adaptor that communicates using the wireless protocol, and the wireless adaptor 452a is shown as supporting big data and thus is communicatively connected to the big data network backbone 405. Additionally, the wireless adaptors 452a, 452b may support other communication protocols such as Foundation Fieldbus, PROFIBUS, DeviceNet, etc. Furthermore, the wireless network 470 may include one or more network access points 455a, 455b, which may be separate physical devices in wired communication with the wireless gateway 435 or may be provided with the wireless gateway 435 as an integral device. In FIG. 4, the network access point 455a is illustrated as being a big data device BD, while the network access point 455b is a legacy access point. The wireless network 470 may also include one or more routers 458 to forward packets from one wireless device to another wireless device within the wireless communications network 470, each of which may or may not support distributed big data in the process control system 40. The wireless devices 440-446 and 452-458 may communicate with each other and with the wireless gateway 435 over wireless links 460 of the wireless communications network 470, and/or via the big data network backbone 405, if the wireless devices are distributed and/or centralized big data devices.

Accordingly, FIG. 4 includes several examples of big data devices of nodes BD which primarily serve to provide network routing functionality and administration to various networks of the process control system. For example, the wireless gateway 435, the access point 455a, and the router 458 each include functionality to route wireless packets in the wireless communications network 470. The wireless gateway 435 performs traffic management and administrative functions for the wireless network 470, as well as routes traffic to and from wired networks that are in communicative connection with the wireless network 470. The wireless network 470 may utilize a wireless process control protocol that specifically supports process control messages and functions, such as WirelessHART. As shown in FIG. 4, the devices 435, 455a, 452a, 442a, 442b and 458 of the wireless network 470 support big data in the process control plant 40, however, any number of any types of nodes of the wireless network 470 may support distributed big data in the process plant 40.

Other devices that communicate using other wireless protocols may be big data nodes or devices BD of the process control big data network 400. In FIG. 4, one or more wireless access points 472 are big data devices BD that utilize other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 472 allow handheld or other portable computing devices (e.g., user interface devices) to communicative over a respective wireless network that is different from the wireless network 470 and that supports a different wireless protocol than the wireless network 470. In some scenarios, in addition to portable computing devices, one or more process control devices (e.g., controller 411, field devices 415-422, or wireless devices 435, 440-458) may also communicate using the wireless protocol supported by the access points 472.

Additionally in FIG. 4, one or more gateways 475, 748 to systems that are external to the immediate process control system 40 are big data nodes or devices BD of the process control big data network 400. Typically, such systems are customers or suppliers of information generated or operated on by the process control system 40. For example, a plant gateway node 475 may communicatively connect the immediate process plant 40 (having its own respective process control big data network backbone 405) with another process plant having its own respective process control big data network backbone. In another example, a single process control big data network backbone 405 may service multiple process plants or process control environments. In still another example, the plant gateway node 475 communicatively connects the immediate process plant 40 with a cloud big data node 210 and/or a cloud big data appliance 221.

In FIG. 4, a plant gateway node 475 communicatively connects the immediate process plant 40 to a legacy or prior art process plant that does not include a process control big data network 400 or backbone 405. In this example, the plant gateway node 475 may convert or translate messages between a protocol utilized by the process control big data backbone 405 of the plant 40 and a different protocol utilized by the legacy system (e.g., Ethernet, Profibus, Fieldbus, DeviceNet, etc.). The one or more external system gateway nodes 478 communicatively connect the process control big data network 400 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 4 only illustrates a single controller 411 with a finite number of field devices 415-22 and 440-446, this is only an illustrative and non-limiting embodiment. Any number of controllers 411 may support big data, and any of the controllers 411 may communicate with any number of wired or wireless field devices 415-422, 440-446 to control a process in the plant 40. Furthermore, the process plant 40 may also include any number of wireless gateways 435, routers 458, access points 455, wireless process control communications networks 470, access points 472, and/or gateways 475, 478. Still further, FIG. 4 may include any number of centralized big data appliances 408, which may receive and store collected data and/or generated learned data or knowledge from any or all of the devices in the process plant 40. In some embodiments, the process control big data network 400 may include any number of regional big data appliances and nodes (not shown in FIG. 4).

Further, the combination of aspects, devices, and components included in the example process plant 40 as illustrated by FIG. 4 is exemplary only. The techniques, systems, methods, and apparatuses disclosed herein may be utilized in process plants with zero or more any of the aspects illustrated in FIG. 4. For example, the techniques, systems, methods, and apparatuses disclosed herein may be utilized in a process plant without a centralized big data appliance 408, or in a process plant with one or more regional big data appliances and/or nodes. In another example, the techniques, systems, methods, and apparatuses disclosed herein may be utilized in a process plant with only legacy devices.

Referring now simultaneously to FIGS. 1-4, any number of any the nodes 202, 206, 208, 210 of the process control big data network, the big data appliances 212, 216, 218, 221, the big data nodes 411, 415, 416, 418, 419, 420, 421, 426, 428,435, 442a, 442b, 444, 452a, 455a, 458, 472, 475, 478, and/or the legacy devices 417, 422, 440, 446, 448, 450, 452b, 455b may be configured to and operable to stream data. For example, with respect to legacy devices, function blocks may, in some embodiments, be instantiated within one or more of the legacy devices to implement the data streaming described herein.

Specifically, data streaming as described herein below may occur in various contexts between various devices and device types. With reference still to FIG. 4, legacy devices (e.g., device 417) and/or field devices having embedded big data nodes (e.g., 415, 416), may stream data to I/O devices (e.g., I/O devices 426, 428), legacy devices (e.g., device 417) and/or field devices having embedded big data nodes (e.g., 415, 416), may stream data directly to a controller (e.g., 411) and/or to any big data node (e.g., 411, 415, 416, 418, 419, 420, 421, 426, 428,435, 442a, 442b, 444, 452a, 455a, 458, 472, 475, 478) or big data appliance (e.g., 408), controllers (e.g., 411) may stream data to big data nodes in I/O devices (e.g., 426, 428), field devices (e.g., 419), other controllers, big data appliances (e.g., 408), servers/gateways (e.g., 478), and external devices (not shown). Big data nodes (e.g., 419) and big data appliances (e.g., 408) may stream data to any other big data node or big data appliance or to any requesting device, including, by way of example and not limitation, any other big nodes or big data appliances, external devices, servers, mobile devices, and workstations.

An advantage of the presently described data streaming techniques, methods, and systems includes the availability of data and metadata at the time it is needed and/or requested. The available data include continuous IO data, data from function blocks, events, batch data, lab entry data, spectral data, alarm data, analysis data, etc. For the data to be useful, for example, in embodiments where the consumer of the data is a function block or a controller, the data values must be collected at the rate at which they are accessed or changed within the control system, and streamed to any receiving devices at a rate equal to or greater than the rate at which they are access or changed within the control system. In previous systems, collection data at the same or greater rate as the data is generated is prevented by several system limitations, including the design of the controller, the communications architecture of the system, and the capabilities and design of the data historians. Each of these limitations will be explained below, and the improvements to each described relative to the presently described techniques.

Controllers designed for previous generations of systems were not designed to collect and/or buffer data as the data are being generated in or received at the controller. Typically, controllers capture periodic snapshots of the system parameter values, and communicate the snapshot of values to a downstream node for collection and storage in a historian. By capturing only periodic snapshots, changes, short-term trends, and instability in data or events may be missed or, if captured, may be delayed before being communicated to a downstream node for analysis or storage.

A controller in accordance with the presently described techniques, methods, and systems for data streaming is redesigned to facilitate the buffering that is required to support big data collection and storage. Among the improvements to controller design are the inclusion of additional memory. A double buffer mechanism is operable to capture block parameters after module execution as fast as the modules can execute (e.g., 100 msec). As a first buffer collects data, a second buffer streams the data to one or more receiving devices (e.g., to a big data node and/or a big data appliance).

At the same time, the communications infrastructures of previous systems were designed to send individual parameter values from device to device. As described herein, the present system is designed to capture and send large numbers of parameters and data, and can send the data as a stream, allowing more of the available data in the system to be collected, utilized, analyzed, stored, and processed. Additionally, the present system minimizes network overhead by sending data and metadata separately, allowing metadata to be transmitted over the network only when it is needed.

Historians were likewise ill-equipped to support the collection of all data in a process. Instead, historians were designed to support collection of continuous process data, but event data such as process alarms, batch data, or hardware alarms were stored in a different database, making it difficult to analyze in real-time (or non-real time, for that matter) with the continuous process data. Other types of data (e.g., hardware or communications diagnostic data) were not stored at all in order to reduce disk access time and storage space. Further, historians generally required data to be stored in a compressed format, which can cause the loss of valuable information through so-called "compression loss." The improved techniques, methods, and systems, including the methods by which data are transmitted between devices separately from corresponding metadata facilitate the collection, storage, and organization of the higher volumes of data while simultaneously minimizing the processing required to efficiently process the incoming data.

The improved data transmission techniques (i.e., data streaming) are described below with respect to communication between a controller and a big data node or big data appliance. However, the same principles should be understood to apply to communications to and from other devices, in various combinations as described above.

In the described data streaming techniques, devices and, in particular, devices receiving a data stream maintain information, in the form of metadata, about the content and structure of the data stream. As a result, the network bandwidth required to communicate a given set of data is reduced. The "resident" metadata—metadata that are stored on the device—falls into three general categories: standard data descriptions, custom data descriptions, and stream format metadata. Standard data descriptions define parameters that are streamed by default, and will be defined for function blocks, units, and devices that access and/or act upon process inputs and outputs by default. Similarly, when a user assigns additional parameters to be collected, stored, and/or analyzed as part of the big data, custom data descriptions define the parameter to be communicated, including the data type, name, and associated module or block. The data descriptions facilitate the processing of the standard and additional parameters by the controller and/or the big data appliance. The resident metadata also include stream format data that define the process data, alarm data, event data, and device diagnostic data that may be included in the data stream. For each data type, and for each source within the data type, the stream format metadata include an ID assigned by the controller to each instance of a function block, parameter, unit, device, alarm, and/or event, and a link to the associated metadata for that ID.

Figure 5:
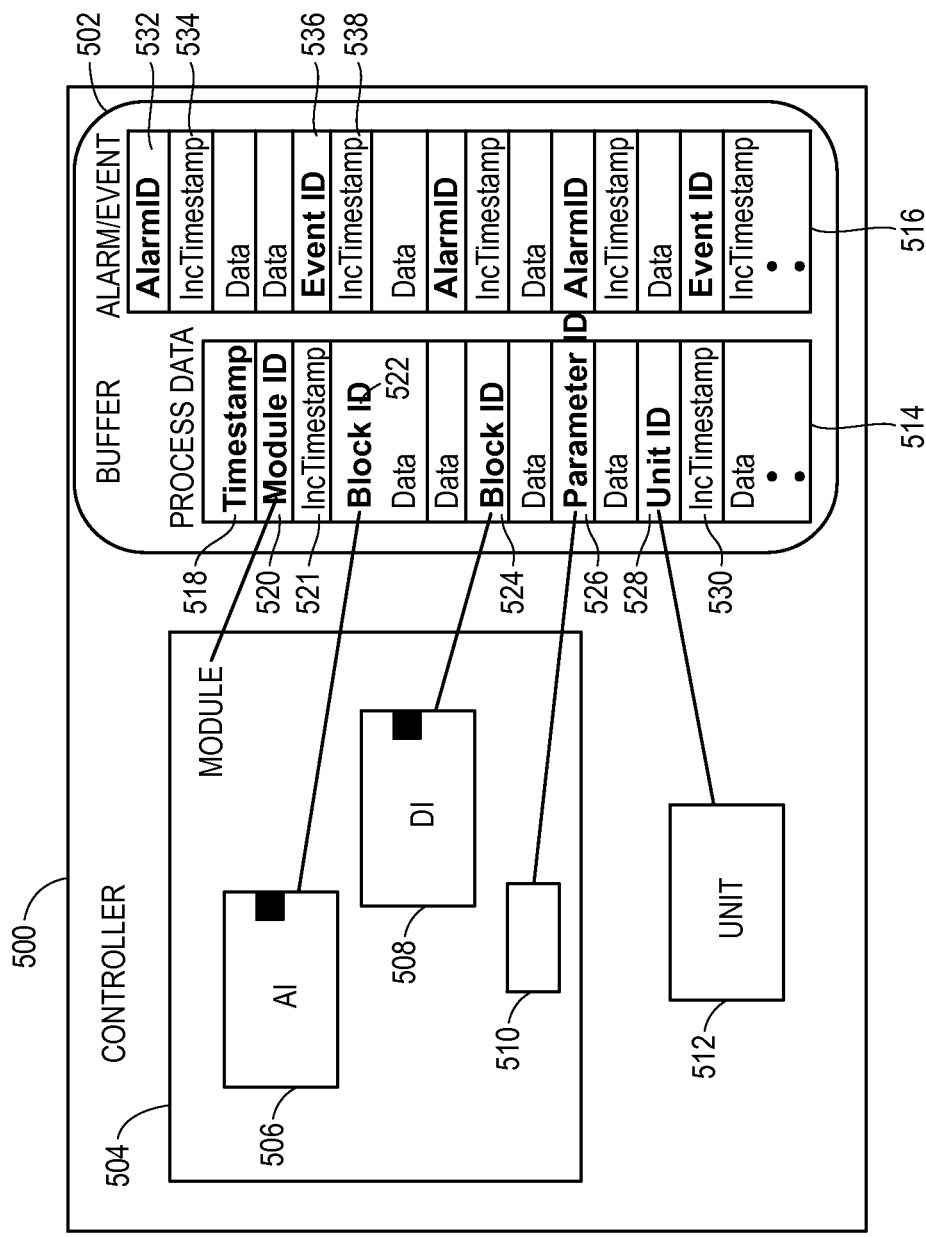
FIG. 5 is a block diagram of an example controller implementing data streaming according to the described methods.

FIG. 5 depicts a block diagram of an example controller 500. The example controller 500 includes a buffer 502, which may be one of two or more buffers that reside in one or more memory devices of the controller 500. The buffer 502 depicted in FIG. 5 represents a set of data to be streamed from the controller to another device, such as a workstation or a big data node/appliance. The controller 500 also includes a control module 504 with an analog input block 506, a digital input block 508, and a parameter 510, each of which generates data and sends the data to the buffer 502. A unit 512 also provides data to the buffer 502. In embodiments, data may be added to the buffer from the control module 504, input blocks 506 and 508, parameter 510, and the unit 512, according to a variety of functions such as one or more of the functions described with reference to FIG. 1. For example, a collection block 104 may collect data from the module 504, the input blocks 506 and 508, the parameter 510, and the unit 512, to be placed in the buffer 502.

In embodiments, the data in the buffer 502 do not correspond with a particular execution of a unit or module, but instead span multiple executions of the unit or module. That is, the buffer 502 may be large enough (i.e., have sufficient memory allocated to it) that it can collect data over multiple executions of the module 504 before streaming the collected data, without overflowing. The time between the start of buffering and the streaming of the buffered data is dependent on how often the data are needed and/or requested, the size of the buffers 502, the type and quantity of data being collected and stored in the buffer 502, the number of modules 504 assigned to the buffer 502 and/or to the controller 500, etc. Various tradeoffs between transmitting data often (to achieve close-to-real-time availability) and buffering large quantities of data (to decrease traffic frequency on the network, for example) will be apparent to those of ordinary skill, and can be configured according to the requirements of a particular system.

In any event, the buffer 502 may collect and temporarily store both process data 514 and alarm/event data 516. Each set of streamed data has a full timestamp 518. The timestamp 518 may correspond, for example, to the time that the buffer 502 commenced collecting data (which would typically correspond to the time that another buffer stopped collecting data and commenced streaming the data it had collected). Additionally, each module or unit included in the data stream (and, correspondingly, in the data buffer 502) will be indicated with an identifier (ID) and will have a corresponding incremental timestamp, indicating the offset from the timestamp 518. For example, in FIG. 5, the buffer 502 includes a module ID 520 corresponding to the module 504 and an incremental timestamp 521 corresponding to the execution time of the module 504. For a particular module the buffer further includes identifiers for each block and/or parameter in the module. Data in the buffer 502 for the module 506, for example, includes a block ID 522 corresponding to the analog input block 506, a block ID 524 corresponding to the digital input block 524, and a parameter ID 526 corresponding to the parameter 510. A unit ID 528 corresponds to the unit 512, and has an associated incremental timestamp 530 corresponding to the execution time of the unit 512. Each of the IDs is followed (after any timestamps) by corresponding data as depicted in FIG. 5. In some embodiments, a size field may be included in the data to be streamed (see, e.g., FIG. 7). The size field may be reserved until the buffer is full or otherwise ready to be streamed to a receiving device, and a value input into the field upon completion of the data collection, once the data stream is formatted to be transmitted.

The buffer 502 also includes the alarm and event data 516. Like the process data 514, the alarm and event data 516 includes an ID and an incremental timestamp for each event and/or alarm, in addition to the data for the alarm or the event. For example, FIG. 5 depicts an alarm ID 532 and an incremental timestamp 534 before the data for the alarm corresponding to the alarm ID 532, and an event ID 536 and an incremental timestamp 538 before the data for the event corresponding to the event ID 536. Of course, alarms and events may occur multiple times in the course of execution of a particular module, or during the period that the buffer is collecting data. Accordingly, the buffer may include multiple instances of a particular event and/or alarm ID.

Figure 6:
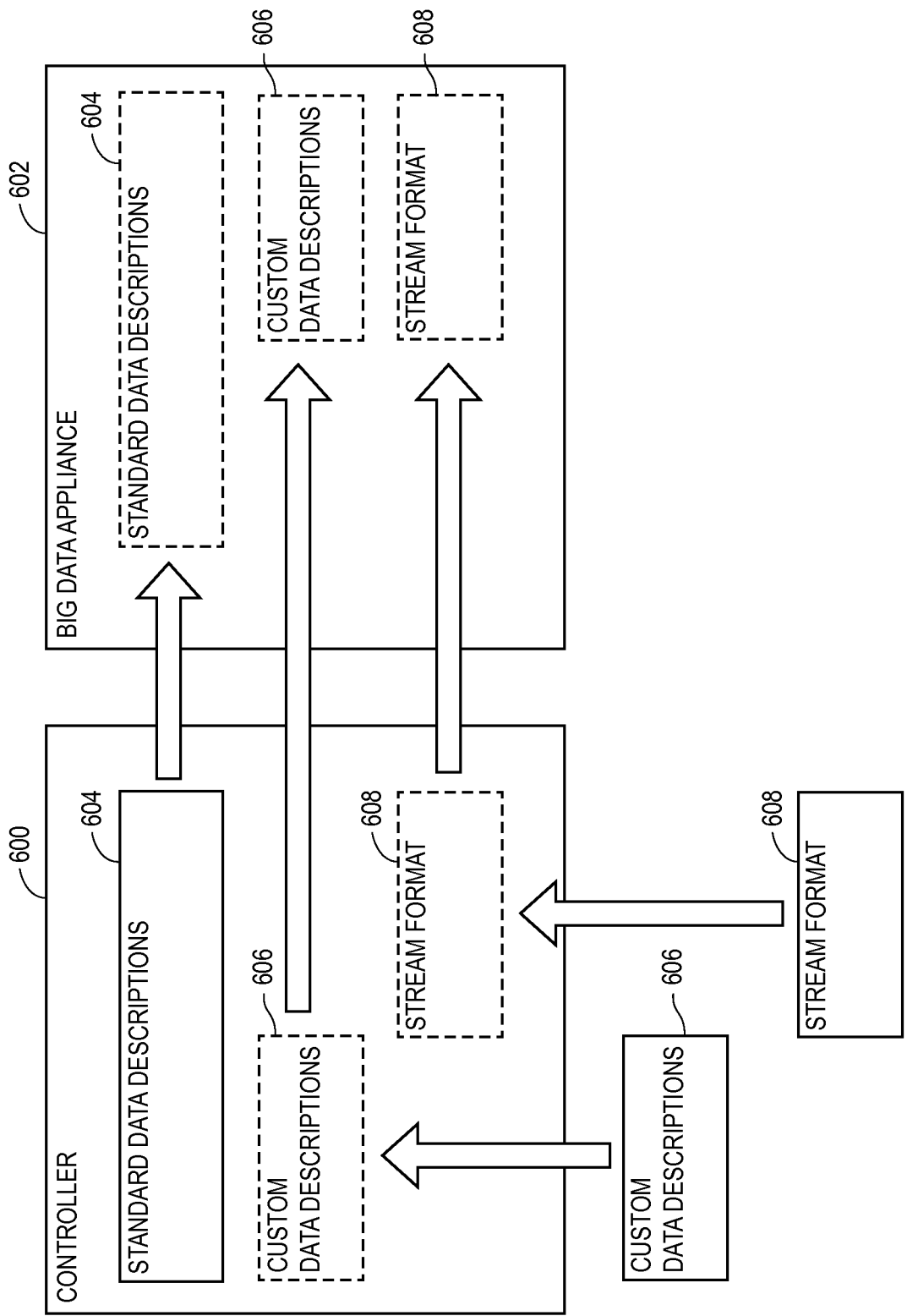
FIG. 6 is a block diagram illustrating the flow of metadata in example components of a process control system implementing data streaming according to the described methods.

FIG. 6 illustrates one arrangement for configuring a controller 600 and a big data appliance 602 for data streaming. In the illustrated arrangement, the controller 600 is pre-loaded with a set of standard data descriptions (metadata) 604. The standard data descriptions 604 define the data that are streamed by default. If the user assigns additional block, module, unit, and/or device parameters to be streamed, then identifiers (IDs) are automatically assigned to the additional parameters and uploaded to the controller 600 as custom data descriptions (metadata) 606. A stream format description (metadata) 608 defines the format of the data stream including, what data are included in the stream, and the ID assigned by the controller to each instance of a function block, parameter, unit, device, alarm, and event, and provides a link to the associated description metadata 604 and/or 606. Though FIG. 6 depicts the custom data descriptions 606 and the stream format description 608 being uploaded to the controller 600, in some embodiments, the controller may be capable of generating the custom data descriptions 606 and/or the stream format description 608 within the controller 600 when the controller is configured to collect data and/or to utilize data to control the process plant.

Figure 7:
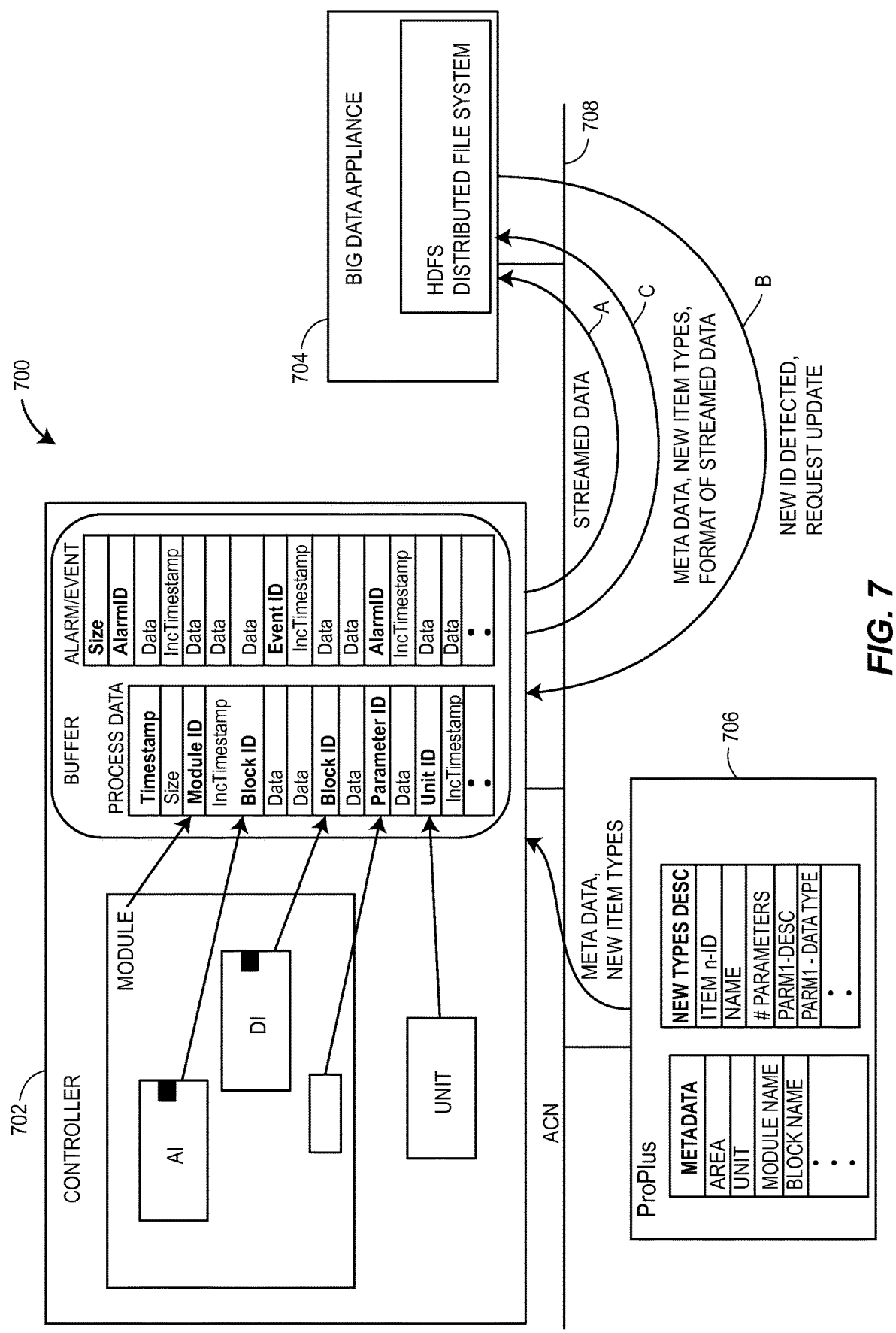
FIG. 7 is a block diagram illustrating the flow of data and metadata in example components of a process control system implementing data streaming.

In any event, the controller 600 communicates all of the metadata to the big data appliance 602. In this manner, the big data appliance 602 is automatically configured to receive the data stream, before any data is actually transmitted to the big data appliance 602. The data stream thereafter communicated from the controller 600 to the big data appliance 602 need only include the identifiers assigned by the controller, the timestamps, and the data. No additional metadata are required to be streamed with the data, thereby reducing bandwidth overhead and decreasing the time required to stream a given quantity of data. While the big data appliance 602 is depicted in FIG. 7 as a stand-alone device, the big data appliance 602 could, instead, be any big data node as described with reference to FIG. 2, for example. Additionally, the sending device, while depicted and described as a controller 600 need not be a controller at all. Instead, the arrangement above may be used between any two sending and receiving devices including, by way of example, between a first big data node and a second big data node, between a big data node and a mobile device (e.g., a smart phone, tablet computer, laptop computer, etc.), between a big data node and a cloud server, between a big data node and an analytics module, etc.

In embodiments, the techniques, methods, and systems for data streaming include mechanisms that facilitate automatic updating of the streaming metadata when the receiving device encounters an unknown element in the data stream. FIG. 7 illustrates one such implementation in the form of a block diagram. In FIG. 7, a portion 700 of a process control system includes a controller 702, a big data appliance 704, a configuration database 706, a big data network backbone 708 communicatively coupling the controller 702, the big data appliance 704 and the configuration database 706. In the example portion 700 of a process control system depicted in FIG. 7, the controller 702 and the big data appliance 704 are configured as described above with respect to FIG. 6. As depicted in FIG. 7, however, as data (line "A", in FIG. 7) are streamed from the controller 702 to the big data appliance 704, it is possible that the data stream will include a new ID in the data stream (e.g., because a user added a parameter to the controller 702, and the parameter was added to the data stream). When the big data appliance 704 encounters the new ID in the data stream, the big data appliance 704 will not recognize the ID and will send a request (line "B", in FIG. 7) to the controller 702 to send updated metadata. The controller 702 will send updated metadata (line "C", in FIG. 7), which may include one or more of the standard data descriptions, the custom data descriptions, and the stream format description. In an embodiment, the controller 702 sends the custom data descriptions and the stream format description.

FIGS. 8A and 8B are flow charts depicting the method described above. In particular, FIG. 8A depicts a method 800 for streaming data to another device, while FIG. 8B depicts a method 801 for receiving a data stream. Collectively, the FIGS. 8A and 8B depict the flow of data (broken lines) between the two devices and the operation of the methods 800 and 801 with respect to one another. In some embodiments, the transmitting device (the device performing the streaming of the data) is a controller streaming data to receiving device that comprises big data appliance (e.g., for historization), while in other embodiments, the transmitting device is a big data node (e.g., a node comprising a big data appliance storing historized data) to a receiving device that is a workstation computer, a laptop computer, a tablet computer, a smart phone, etc. However, the methods 800 and 801 are not limited, respectively, to controllers and big data nodes. Instead, the methods 800 and 801 may apply, respectively, to any device transmitting a data stream and any device receiving a data stream. In the method 800, the transmitting device (i.e., the device streaming data) stores metadata (block 802). The stored metadata provide information about the data being streamed, information about the structure of the data stream, or both. In some embodiments, the stored metadata are used by the transmitting device to collect the data to be streamed (e.g., to know which data to collect) and/or to determine which data to include in the data stream. In any event, the metadata are transmitted to the receiving device (block 806). The metadata may be transmitted to the receiving device any time after they are stored. In embodiments, the metadata are transmitted to the receiving device immediately upon becoming available in the transmitting device, while in other embodiments, the metadata are transmitted to the receiving device immediately prior to the first data stream transmission. The receiving device receives the metadata (block 803) and stores the metadata locally.

The data for the data stream are collected and buffered/stored locally prior to transmission (block 804). In embodiments, a trigger event causes the active butter to start streaming data and, presumably, buffering of incoming data is handled by a previously non-active buffer. In any event, the collected/buffered data are streamed to a receiving device (block 808). The receiving device receives the data stream (block 805) and parses the data stream according to the received metadata (block 807). If, while parsing the data stream, the receiving device does not encounter any new, unrecognized IDs among the data in the data stream (block 809), then the receiving device continues to receive and parse the data stream (blocks 805, 807). If, on the other hand, the receiving device encounters one or more new, unrecognized IDs among the data in the data stream (block 809), then the receiving device caches the data in the data stream (block 811) and sends a request to the transmitting device, requesting updated metadata (block 813).

At the same time, the transmitting device continues to collect and buffer data (block 810), and to stream the data to the receiving device (block 812). If the transmitting device does not receive a request for updated metadata (block 814), then the transmitting device continues to collect and buffer data, and to stream the data to the receiving device. However, if the transmitting device receives a request for updated metadata (block 814), then the transmitting device generates or receives updated metadata (block 816), and transmits the updated metadata to the receiving device (block 818), before continuing to collect, buffer, and transmit the data as a stream.

When the receiving device receives the updated metadata (block 815), the receiving device parses and processes (e.g., historizing it, if the receiving device is a big data appliance) the cached data stream (block 817), before proceeding to continue to receive the data stream from the transmitting device (block 805).

In an alternative embodiment, the transmitting device updates the metadata for the data stream as soon as a configuration change occurs. That is, instead of waiting for a request to send updated data to the receiving device, the transmitting device automatically generates updated metadata upon any configuration change, and transmits the updated metadata to the receiving device before commencing the transmission of a data stream having any new format or any newly added IDs. In this manner, the data stream need not be cached by the receiving device, as the receiving device will always have the metadata required to parse and/or process the data stream. This may have the effect of decreasing cache/memory requirements for the receiving device, and decreasing latency that may be caused by the request for the new metadata and the later parsing/processing of the cached data stream.

Figures 9A, 9B:
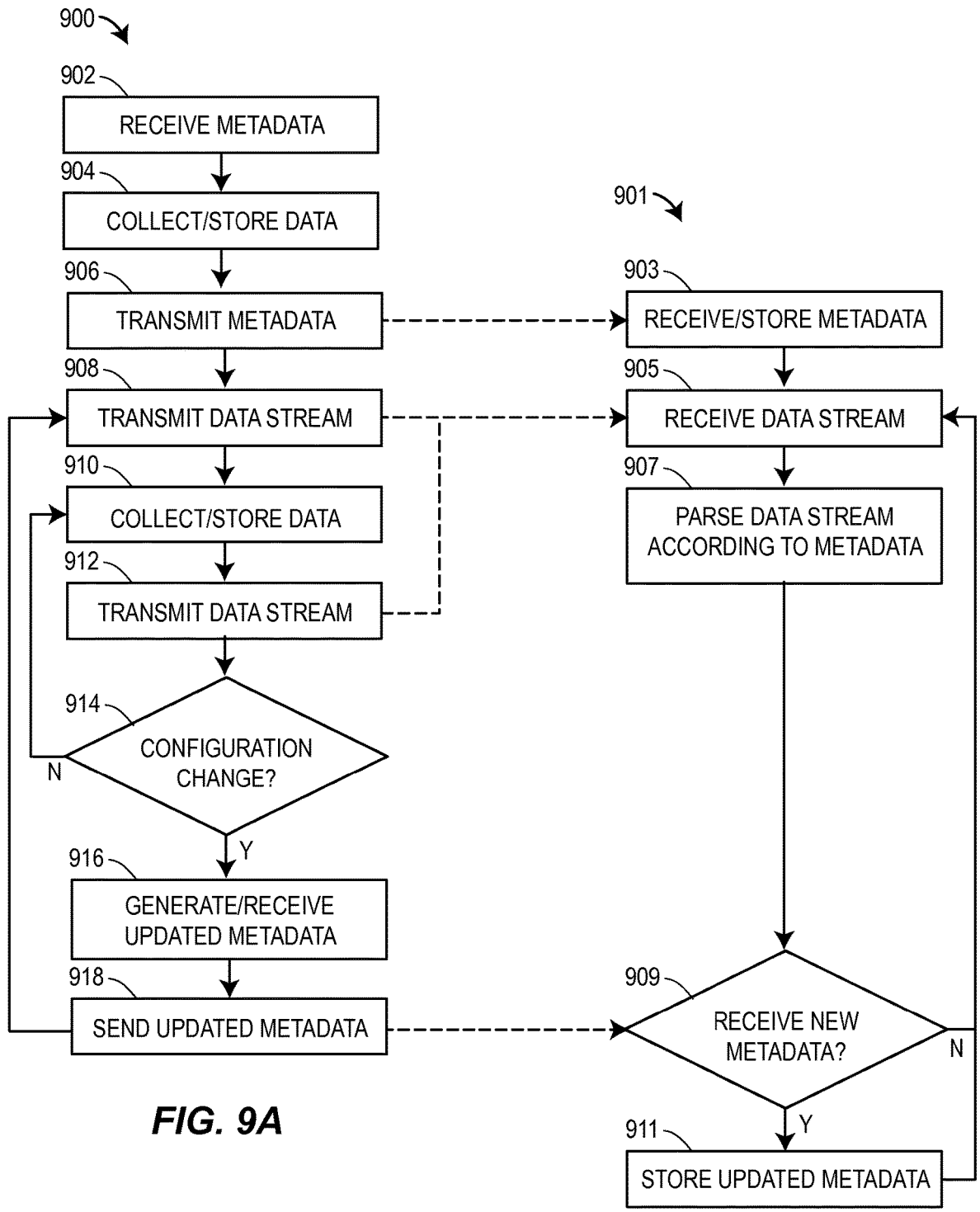
FIGS. 9A and 9B are flow charts respectively depicting an alternate method for streaming data to another device and an alternate method for receiving a data stream, and collectively depicting the flow of data between two devices operating according to the respective alternate methods.

FIGS. 9A and 9B are flow charts depicting the method described above, which is a variation of the method of FIGS. 8A and 8B. In particular, FIG. 9A depicts a method 900 for streaming data to another device, while FIG. 9B depicts a method 901 for receiving a data stream. Collectively, the FIGS. 9A and 9B depict the flow of data (broken lines) between the two devices and the operation of the methods 900 and 901 with respect to one another. As with the methods 800 and 801, the methods 900 and 901 may be implemented, respectively, by any device transmitting a data stream and any device receiving a data stream.

In the method 900, the transmitting device (i.e., the device streaming data) stores metadata (block 902). The stored metadata provide information about the data being streamed, information about the structure of the data stream, or both. In some embodiments, the stored metadata are used by the transmitting device to collect the data to be streamed (e.g., to know which data to collect) and/or to determine which data to include in the data stream. In any event, the metadata are transmitted to the receiving device (block 906). The metadata may be transmitted to the receiving device any time after they are stored. In embodiments, the metadata are transmitted to the receiving device immediately upon becoming available in the transmitting device, while in other embodiments, the metadata are transmitted to the receiving device immediately prior to the first data stream transmission. The receiving device receives the metadata (block 903) and stores the metadata locally.

The data for the data stream are collected and buffered/stored locally prior to transmission (block 904). In embodiments, a trigger event causes the active buffer to start streaming data and, presumably, buffering of incoming data is handled by a previously non-active buffer. In any event, the collected/buffered data are streamed to a receiving device (block 908). The receiving device receives the data stream (block 905) and parses the data stream according to the received metadata (block 907). At the same time, the transmitting device continues to collect and buffer data (block 910), and to stream the data to the receiving device (block 912). If the configuration of the transmitting device is not changed or updated (block 914), then the transmitting device continues to collect and buffer data (block 910), and to stream the data to the receiving device (block 912). However, if the configuration of the transmitting device is changed (block 914), then the transmitting device generates or receives updated metadata (block 916), and transmits the updated metadata to the receiving device (block 918), and transmits the updated data stream (block 908) before continuing to collect, buffer, and transmit the data as a stream (blocks 910, 912).

If the receiving device does not receive new metadata (block 909), then the receiving device continues to receive the data stream (block 905) and parse the data stream according to the stored metadata (block 907). However, if the receiving device receives updated metadata (block 909), the receiving device stores the updated metadata (block 911) and then continues to receive the data stream (block 905) and parses and processes (e.g., historizing it, if the receiving device is a big data appliance) the data stream according to the (newly stored) updated metadata (block 907).

Embodiments of the techniques described in the present disclosure may include any number of the following aspects, either alone or combination:

1. A method for communicating data in a process control system, the method comprising: storing a first set of metadata in a device operable to transmit a data stream; storing, in the device operable to transmit the data stream, a set of data for transmitting as the data stream; transmitting the first set of metadata to a device operable to receive the data stream; receiving the first set of metadata at the device operable to receive the data stream; transmitting the data stream to the device operable to receive the data stream;

receiving the data stream at the device operable to receive the data stream, after receiving the first set of metadata; and parsing the received data stream, at the device operable to receive the data stream, according to the first set of metadata.

2. The method according to aspect 1, wherein the first set of metadata includes stream format description metadata describing the structure of the data stream.

3. The method according to either aspect 1 or aspect 2, wherein the first set of metadata includes data description metadata describing the content of the data stream.

4. The method according to aspect 3, wherein the data description metadata includes standard data description metadata and custom data description metadata.

5. The method according to any one of the preceding aspects, wherein the set of data includes parameter data, module and block data, event data, and alarm data.

6. The method according to any one of the preceding aspects, wherein the device operable to transmit the data stream is a controller, and wherein the device operable to receive the data stream comprises a big data appliance.

7. The method according to aspect 6, wherein the controller is pre-configured with a set of standard data descriptors.

8. The method according to either aspect 6 or aspect 7, wherein the controller automatically generates a set of custom data descriptors when a new parameter is added to the parameters assigned to the controller.

9. The method according to any one of the preceding aspects, wherein device operable to transmit the data stream automatically updates the metadata if a configuration of the device operable to transmit the data stream is changed.

10. The method according to any one of aspects 1 to 5, wherein the device operable to transmit the data stream comprises a big data appliance, and wherein the device operable to receive the data stream is a device selected from the group consisting of: a workstation computer, a laptop computer, a smart phone, and a tablet computer.

11. The method according to any one of aspects 1 to 5, wherein the device operable to transmit the data stream comprises a big data appliance, and wherein the device operable to receive the data stream is a cloud computing device.

12. The method according to any one of the preceding aspects, further comprising: identifying in the data stream, at the device operable to receive the data stream, an identifier that is not in the first metadata; caching the data stream at the device operable to receive the data stream; sending a request, from the device operable to receive the data stream to the device operable to send the data stream, to provide an updated set of metadata; receiving the request to provide the updated set of metadata at the device operable to send the data stream; sending the updated set of metadata from the device operable to send the data stream to the device operable to receive the data stream; receiving, at the device operable to receive the data stream, the updated set of metadata; and parsing the cached data stream according to the updated set of metadata.

13. The method according to any one of the preceding aspects, further comprising: recognizing, in the device operable to send the data stream, a configuration change; updating the metadata according to the recognized configuration change; sending the updated metadata from the device operable to send the data stream to the device operable to receive the data stream; receiving, at the device operable to receive the data stream, the updated set of metadata; and sending, from the device operable to send the data stream to the device operable to receive the data stream, the data stream, wherein the data stream is structured according to the updated set of metadata; and parsing the data stream, in the device operable to receive the data stream, according to the updated set of metadata.

14. The method of any one of the preceding aspects, wherein storing, in the device operable to transmit the data stream, the set of data for transmitting as the data stream comprises: collecting data from a plurality of process control devices; and queuing the collected data to until a trigger event.

15. The method according to aspect 14, wherein the trigger event is one of: a queue in which the collected data are queued is full, a time-to-send timer expires, or a client requests data in the queue.

16. The method according to any one of the preceding aspects, wherein the first set of metadata comprises metadata describing a relationship of a first subset of data in the set of data to a second subset of data in the set of data.

17. The method according to aspect 16, wherein the relationship is an upstream relationship.

18. The method according to aspect 16, wherein the relationship is a downstream relationship.

19. The method according to any one of the preceding aspects, further comprising performing an analysis on the set of data to generate analysis data.

20. The method according to aspect 19, wherein the analysis is performed at the device operable to transmit the data stream, and wherein the analysis data are added to the data stream.

21. The method according to any one of the preceding aspects, wherein the data stream comprises a timestamp.

22. The method according to aspect 21, wherein the data stream comprises a plurality of incremental timestamps, each incremental timestamp associated with a sub-set of data in the set of data.

23. The method according to any one of the preceding aspects, wherein the data stream comprises a plurality of identifiers, each identifier identifying one of a block, a module, a parameter, an event, or an alarm.

24. A method of streaming data in a process control system, the method comprising: storing a first set of metadata in a device operable to transmit a data stream; collecting a set of data for transmitting as the data stream; buffering the set of collected data; transmitting the first set of metadata to a device operable to receive the data stream; and transmitting the data stream to the device operable to receive the data stream, wherein no further metadata are transmitted unless a trigger event causes the device operable to transmit the data stream to transmit additional metadata.

25. The method according to aspect 24 further comprising: receiving a request for updated metadata; generating or downloading updated metadata; and sending updated metadata in response to the request for updated metadata.

26. The method according to aspect 24, further comprising: recognizing a changed configuration parameter; generating or downloading updated metadata; and sending the updated metadata to the device operable to receive the data stream before sending a data stream according to the updated metadata.

27. The method according to any one of aspects 24 to 26, wherein the first set of metadata includes stream format description metadata describing the structure of the data stream.

28. The method according to any one of aspects 25 to 27, wherein the first set of metadata includes data description metadata describing the content of the data stream.

29. The method according to aspect 28, wherein the data description metadata includes standard data description metadata and custom data description metadata.

30. The method according to any one of aspects 24 to 29, wherein the set of data includes parameter data, module and block data, event data, and alarm data.

31. The method according to any one of aspects 24 to 30, wherein the device operable to transmit the data stream is a controller, and wherein the device operable to receive the data stream comprises a big data appliance.

32. The method according to aspect 31, wherein the controller is pre-configured with a set of standard data descriptors.

33. The method according to either aspect 31 or aspect 32, further comprising automatically generating a set of custom data descriptors when a new parameter is added to the parameters assigned to the controller.

34. The method according to any one of aspects 24 to 30, wherein the device operable to transmit the data stream comprises a big data appliance, and wherein the device operable to receive the data stream is a device selected from the group consisting of: a workstation computer, a laptop computer, a smart phone, and a tablet computer.

35. The method according to any one of aspects 24 to 30, wherein the device operable to transmit the data stream comprises a big data appliance, and wherein the device operable to receive the data stream is a cloud computing device.

36. The method according to any one of aspects 24 to 35, wherein the first set of metadata comprises metadata describing a relationship of a first subset of data in the set of data to a second subset of data in the set of data.

37. The method according to aspect 36, wherein the relationship is an upstream relationship.

38. The method according to aspect 36, wherein the relationship is a downstream relationship.

39. The method according to any one of aspects 24 to 38, further comprising performing an analysis on the set of data to generate analysis data.

40. The method according to aspect 39, further comprising adding the analysis data to the data stream.

41. The method according to any one of aspects 24 to 40, wherein the data stream comprises a timestamp.

42. The method according to aspect 41, wherein the data stream comprises a plurality of incremental timestamps, each incremental timestamp associated with a sub-set of data in the set of data.

43. The method according to any one of aspects 24 to 42, wherein the data stream comprises a plurality of identifiers, each identifier identifying one of a block, a module, a parameter, an event, or an alarm.

44. A method for receiving a data stream in a process control system, the method comprising: receiving a first set of metadata from a device operable to transmit the data stream; receiving the data stream after receiving the first set of metadata; parsing the received data stream according to the first set of metadata; and continuing to receive streamed data as long as the data stream can be parsed according to the first set of metadata.

45. The method according to aspect 44, further comprising: identifying in the data stream an ID that cannot be parsed according to the first set of metadata; caching the data stream; sending a request to the device operable to send the data stream to provide updated metadata; receiving the updated metadata; parsing the cached data stream according to the updated metadata; continuing to receive the data stream; and parsing the data stream according to the updated metadata.

46. The method according to aspect 44, further comprising: receiving updated metadata; continuing to receive the data stream; and parsing the data stream according to the updated metadata, wherein the data stream received after the updated metadata can be parsed according to the updated metadata, and could not be parsed according to the first set of metadata.

47. The method according to any one of aspects 44 to 46, wherein the first set of metadata includes stream format description metadata describing the structure of the data stream.

48. The method according to any one of aspects 44 to 47, wherein the first set of metadata includes data description metadata describing the content of the data stream.

49. The method according to aspect 48, wherein the data description metadata includes standard data description metadata and custom data description metadata.

50. The method according to any one of aspects 44 to 49, wherein the set of data includes parameter data, module and block data, event data, and alarm data.

51. The method according to any one of aspects 44 to 50, wherein the device operable to transmit the data stream is a controller, and wherein the method is performed by a device comprising a big data appliance.

52. The method according to aspect 51, wherein the controller is pre-configured with a set of standard data descriptors.

53. The method according to either aspect 51 or aspect 52, wherein the controller automatically generates a set of custom data descriptors when a new parameter is added to the parameters assigned to the controller.

54. The method according to any one of aspects 44 to 50, wherein the device operable to transmit the data stream comprises a big data appliance, and wherein the device performing the method is a device selected from the group consisting of: a workstation computer, a laptop computer, a smart phone, and a tablet computer.

55. The method according to any one of aspects 44 to 50, wherein the device operable to transmit the data stream comprises a big data appliance, and wherein the device performing the method is a cloud computing device.

56. The method according to any one of aspects 44 to 55, wherein the first set of metadata comprises metadata describing a relationship of a first subset of data in the set of data to a second subset of data in the set of data.

57. The method according to aspect 56, wherein the relationship is an upstream relationship.

58. The method according to aspect 56, wherein the relationship is a downstream relationship.

59. The method according to any one of aspects 44 to 58, further comprising performing an analysis on the set of data to generate analysis data.

60. The method according to aspect 59, wherein the analysis data are stored in a big data appliance.

61. The method according to any one of aspects 44 to 60, wherein the data stream comprises a timestamp.

62. The method according to aspect 61, wherein the data stream comprises a plurality of incremental timestamps, each incremental timestamp associated with a sub-set of data in the set of data.

63. The method according to any one of aspects 44 to 62, wherein the data stream comprises a plurality of identifiers, each identifier identifying one of a block, a module, a parameter, an event, or an alarm.

64. A controller for a process control system, the controller comprising: a processor; a memory communicatively coupled to the processor and storing a set of metadata; an input receiving data from one or more process control devices; one or more routines executing on the processor, according at least in part to the received data, to control the process; a collection routine executing on the processor and collecting data received from the one or more process control devices; a queuing routine executing on the processor to store the collected data in a buffer; a data streaming routine executing on the processor and cooperating with a communication device to: transmit the stored set of metadata to a receiving device; assemble the buffered data into a data stream according to the stored set of metadata; and transmit the data stream to the receiving device.

65. The controller according to aspect 64, wherein the data streaming routine executing on the processor is further operable to: receive a request for updated metadata; generate or download updated metadata; and send the updated metadata in response to the request for updated metadata.

66. The controller according to aspect 64, further comprising a metadata updating routine operable to receive or generate updated metadata, and wherein the data streaming routine executing on the processor is further operable to: send updated metadata in response to a detected change in a configuration of the controller or in response to the generation or reception of updated metadata; and continue sending the data stream, wherein the data stream sent after the updated metadata are sent is structured according to the updated metadata.

67. The controller according to any one of aspects 64 to 66, wherein the stored set of metadata includes stream format description metadata describing the structure of the data stream.

68. The controller according to any one of aspects 64 to 67, wherein the stored set of metadata includes data description metadata describing the content of the data stream.

69. The controller according to aspect 68, wherein the data description metadata includes standard data description metadata and custom data description metadata.

70. The controller according to any one of aspects 64 to 69, wherein the collected data includes parameter data, module and block data, event data, and alarm data.

71. The controller according to any one of aspects 64 to 70, wherein the receiving device comprises a big data appliance.

72. The controller according to aspect 71, further comprising a routine operative to automatically generate a set of custom data descriptors when a new parameter is added to the parameters assigned to the controller.

73. The controller according to any one of aspects 64 to 70, wherein the receiving device is a device selected from the group consisting of: a workstation computer, a laptop computer, a smart phone, and a tablet computer.

74. The controller according to any one of aspects 64 to 70, wherein the receiving device is a cloud computing device.

75. The controller according to any one of aspects 64 to 74, wherein the stored set of metadata comprises metadata describing a relationship of a first subset of data in the collected data to a second subset of data in the collected data.

76. The controller according to any one of aspects 64 to 75, further comprising an analysis routine executing on the processor to analyze the collected data to generate analysis data.

77. The controller according to aspect 76, wherein the data streaming routine executing on the processor is further operable to add the analysis data to the data stream.

78. The controller according to any one of aspects 64 to 77, wherein the data stream comprises a timestamp.

79. The controller according to aspect 78, wherein the data stream comprises a plurality of incremental timestamps, each incremental timestamp associated with a sub-set of data in the collected data.

80. The controller according to any one of aspects 64 to 79, wherein the data stream comprises a plurality of identifiers, each identifier identifying one of a block, a module, a parameter, an event, or an alarm.

81. A big data appliance for storing big data in a process control system, the big data appliance comprising: a processor; a memory communicatively coupled to the processor; a high fidelity data storage device for storing big data; a receiver operable to: receive a set of metadata; receive a data stream; parse the data stream according to the set of metadata; store data in the high fidelity data storage device according to the parsing; continue to receive and store data as long as the data stream can be parsed according to the first set of metadata.

82. The big data appliance according to aspect 81, wherein the receiver is further operable to: identify in the data stream an ID that cannot be parsed according to the set of metadata; cache the data stream; send a request to provide updated metadata; receive the updated metadata; parse the cached data stream according to the updated metadata; store the data in the high fidelity data storage device according to the parsing; continue to receive the data stream; parse the continued data stream according to the updated metadata; and store the data from the continued data stream in the high fidelity data storage device.

83. The big data appliance according to aspect 81, wherein the receiver is further operable to: receive updated metadata; continue to receive the data stream; and parse the data stream according to the updated metadata, wherein the data stream received after the updated metadata can be parsed according to the updated metadata, and could not be parsed according to the set of metadata.

84. The big data appliance according to any one of aspects 81 to 83, wherein the set of metadata includes stream format description metadata describing the structure of the data stream.

85. The big data appliance according to any one of aspects 81 to 84, wherein the set of metadata includes data description metadata describing the content of the data stream.

86. The big data appliance according to aspect 85, wherein the data description metadata includes standard data description metadata and custom data description metadata.

87. The big data appliance according to any one of aspects 81 to 86, wherein the data stream includes parameter data, module and block data, event data, and alarm data.

88. The big data appliance according to any one of aspects 81 to 87, wherein the big data appliance is operable to stream big data to a downstream device.

89. The big data appliance according to any one of aspects 81 to 88, wherein the set of metadata comprises metadata describing a relationship of a first subset of data in the data stream to a second subset of data in the data stream.

90. The big data appliance according to any one of aspects 81 to 89, further comprising an analysis module operable to perform an analysis on the data in the data stream to generate analysis data.

91. The big data appliance according to aspect 90, wherein the analysis data are stored in the high fidelity data storage device.

92. The big data appliance according to any one of aspects 81 to 91, wherein the data stream comprises a timestamp.

93. The big data appliance according to aspect 92, wherein the data stream comprises a plurality of incremental timestamps, each incremental timestamp associated with a sub-set of data in the data stream.

94. The big data appliance according to any one of aspects 81 to 93, wherein the data stream comprises a plurality of identifiers, each identifier identifying one of a block, a module, a parameter, an event, or an alarm.

95. An apparatus in a process control system, the apparatus comprising: a processor; a memory communicatively coupled to the processor and storing a set of metadata; a data source providing data to the apparatus; a queuing routine executing on the processor to buffer data received from the data source; a data streaming routine executing on the processor and cooperating with a communication device to: transmit the stored set of metadata to a receiving device; assemble the buffered data into a data stream according to the stored set of metadata; and transmit the data stream to the receiving device.

96. The apparatus according to aspect 95, wherein the apparatus is a controller and the data source is an input receiving data from one or more process control devices, and further comprising: one or more routines executing on the processor to control the process according at least in part to the received data; and a collection routine executing on the processor and collecting data received from the one or more process control devices.

97. The apparatus according to either aspect 95 or aspect 96, wherein the data streaming routine executing on the processor is further operable to: receive a request for updated metadata; generate or download updated metadata; and send the updated metadata in response to the request for updated metadata.

98. The apparatus according to either aspect 95 or aspect 96, further comprising a metadata updating routine operable to receive or generate updated metadata, and wherein the data streaming routine executing on the processor is further operable to: send updated metadata in response to a detected change in a configuration of the apparatus or in response to the generation or reception of updated metadata; and continue sending the data stream, wherein the data stream sent after the updated metadata are sent is structured according to the updated metadata.

99. The apparatus according to any one of aspects 95 to 98, wherein the stored set of metadata includes stream format description metadata describing the structure of the data stream.

100. The apparatus according to any one of aspects 95 to 99, wherein the stored set of metadata includes data description metadata describing the content of the data stream.

101. The apparatus according to any one of aspects 95 to 100, wherein the receiving device comprises a big data appliance.

102. The apparatus according to any one of aspects 95 to 101, further comprising an analysis routine executing on the processor to analyze the data to generate analysis data.

103. The apparatus according to aspect 102, wherein the data streaming routine executing on the processor is further operable to add the analysis data to the data stream.

104. The apparatus according to any one of aspects 95 to 103, wherein the data stream comprises a timestamp.

105. The apparatus according to aspect 104, wherein the data stream comprises a plurality of incremental timestamps, each incremental timestamp associated with a sub-set of data in the data.

106. The apparatus according to any one of aspects 95 to 105, wherein the data stream comprises a plurality of identifiers, each identifier identifying one of a block, a module, a parameter, an event, or an alarm.

107. An apparatus for receiving a stream of big data in a process control system, the apparatus comprising: a processor; a memory communicatively coupled to the processor; a non-transitory memory device; a receiver operable to: receive a set of metadata; receive a data stream; parse the data stream according to the set of metadata; process data according to the parsing; continue to receive and process data as long as the data stream can be parsed according to the first set of metadata.

108. The apparatus according to aspect 107, wherein the apparatus is a big data appliance for storing big data, wherein the non-transitory memory device comprises a high fidelity data storage device, and wherein processing data comprises storing the data in the high fidelity data storage device.

109. The apparatus according to either aspect 107 or aspect 108, wherein the receiver is further operable to: identify in the data stream an ID that cannot be parsed according to the set of metadata; cache the data stream; send a request to provide updated metadata; receive the updated metadata; parse the cached data stream according to the updated metadata; process the data according to the parsing; continue to receive the data stream; parse the continued data stream according to the updated metadata; and process the data from the continued data stream.

110. The apparatus according to either aspect 107 or aspect 108, wherein the receiver is further operable to: receive updated metadata; continue to receive the data stream; and parse the data stream according to the updated metadata, wherein the data stream received after the updated metadata can be parsed according to the updated metadata, and could not be parsed according to the set of metadata.

111. The apparatus according to any one of aspects 107 to 110, wherein the set of metadata includes stream format description metadata describing the structure of the data stream.

112. The apparatus according to any one of aspects 107 to 111, wherein the set of metadata includes data description metadata describing the content of the data stream.

113. The apparatus according to any one of aspects 107 to 112, wherein the apparatus is operable to stream big data to a downstream device.

114. The apparatus according to any one of aspects 107 to 113, further comprising an analysis module operable to perform an analysis on the data in the data stream to generate analysis data.

115. The apparatus according to aspect 114, wherein the analysis data are stored in the non-transitory memory device.

116. The apparatus according to any one of aspects 107 to 115, wherein the data stream comprises a timestamp.

117. The apparatus according to aspect 116, wherein the data stream comprises a plurality of incremental timestamps, each incremental timestamp associated with a sub-set of data in the data stream.

118. The apparatus according to any one of aspects 107 to 117, wherein the data stream comprises a plurality of identifiers, each identifier identifying one of a block, a module, a parameter, an event, or an alarm.

119. A method according to any of the preceding method aspects, in which data are streamed and/or processed and/or stored at a second rate equal to or greater than a first rate at which the data are collected.

120. A controller according to any of the aspects above, wherein the controller streams data at a second rate equal to or greater than a first rate at which the controller collects the data.

121. A big data appliance according to any of the aspects above, wherein the big data appliance receives and/or processes and/or stores data in a data stream at a second rate equal to or greater than a first rate at which the data are generated in the process.

122. Any one of the preceding aspects in combination with any one or more other preceding aspects.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A system for communicating data in a process control system of a process plant, the system comprising:
a first device that:
is included in the process control system and is operable, during run-time of the process plant, to control a process in the process plant to thereby generate a physical material or product,
is further operable during run-time of the process plant to transmit a data stream, and
is configured to (i) store a set of data for transmitting as the data stream and store a set of metadata descriptive of the data stream, the set of data generated by the first device and including a set of values of one or more parameters whose respective values vary as a result of the first device operating to control the process, and (ii) transmit all of the set of metadata to a second device prior to transmitting the data stream to the second device,
wherein the first device is one of (i) a controller communicatively connected to one or more field devices disposed in the process plant, the controller configured to send control signals to the one or more field devices to thereby control the process during run-time in the process plant, or (ii) one of the one or more field devices, and
wherein the set of metadata comprises (i) respective descriptions of types of data included in the data stream and (ii) a description of a format of the data stream, and includes respective identifiers of one or more portions of a configuration of the first device, the one or more portions of the configuration of the first device including at least one of: a control module that is downloaded into the controller and executable during run-time to generate and send the control signals to the one or more field devices to thereby control the process in the process plant, a function block included in the control module, a process parameter, a unit corresponding to the first device, another device that accesses or acts on at least one of a process input or a process output of the first device, an event, or an alarm;
the second device, the second device being operable to receive the data stream and configured to receive the set of metadata, wherein:
the first device is further configured to transmit the data stream to the second device, and
the second device is further configured to receive the data stream from the first device after receiving all of the set of metadata, and parse the received data stream according to the set of metadata.

2. The system according to claim 1, wherein the description of the format of the data stream that is included in the set of metadata includes a respective identifier assigned by the first device to each of one or more respective instances of a respective function block, a respective control module, a respective parameter, a respective unit corresponding to the first device, a respective other device that accesses or acts on the at least one of the process input or the process output of the first device, a respective event, or a respective alarm.

3. The system according to claim 1, wherein the respective descriptions of the types of data included in the data stream that are included in the set of metadata include a respective identifier assigned by a user to each of one or more of: a respective function block, a respective control module, a respective parameter, a respective unit corresponding to the first device, a respective other device that accesses or acts on the at least one of the process input or the process output of the first device, a respective event, or a respective alarm.

4. The system according to claim 1, wherein the second device that is operable to receive the data stream comprises a big data appliance.

5. The system according to claim 1, wherein the first device automatically updates the set of metadata based on a change to the configuration of the first device.

6. The system according to claim 1, wherein:
the second device that is operable to receive the data stream is further configured to:
identify, in the data stream, an identifier that is not in the set of metadata, wherein the set of metadata is a first set of metadata,
cache the data stream, and
send a request to the first device that is operable to send the data stream to provide an updated set of metadata;
the first device is further configured to:
receive the request to provide the updated set of metadata, and send the updated set of metadata to the second device; and the second device is still further configured to:
receive the updated set of metadata and parse the cached data stream according to the updated set of metadata.

7. The system according to claim 1, wherein:
the first device that is operable to transmit the data stream is further configured to:
recognize a configuration change,
update the set of metadata according to the recognized configuration change, and
send the updated set of metadata to the second device that is operable to receive the data stream; and
the second is further configured to:
receive the updated set of metadata,
receive, from the first device, the data stream, wherein the data stream is structured according to the updated set of metadata, and
parse the data stream according to the updated set of metadata.

8. The system according to claim 1, wherein the system is further configured to perform an analysis on the set of data to generate analysis data.

9. The system according to claim 8, wherein the analysis is performed at the first device that is operable to transmit the data stream, and wherein the analysis data are added to the data stream.

10. The system according to claim 1, wherein the data stream comprises a timestamp.

11. The system according to claim 10, wherein the data stream comprises a plurality of incremental timestamps, each incremental timestamp associated with a sub-set of data in the set of data.

12. The system according to claim 1, wherein the data stream comprises a plurality of identifiers defined by the set of metadata, and respective data corresponding to each identifier included in the plurality of identifiers.

13. A method of streaming data in a process control system of a process plant, the method comprising:
storing a set of metadata in a first device that is (a) operable, during run-time of the process plant, to transmit a data stream, (b) included in the process control system, and (c) further operable, during run-time of the process plant, to control a process in the process plant to thereby generate a physical material or product,
the first device being one of (i) a controller communicatively connected to one or more field devices disposed in the process plant, the controller configured to send control signals to the one or more field devices to thereby control the process during run-time in the process plant, or (ii) one of the one or more field devices, and
the set of metadata comprising (i) respective descriptions of types of data included in the data stream and (ii) a description of a format of the data stream, and including respective identifiers of one or more portions of a configuration of the first device, the one or more portions of the configuration of the first device including at least one of: a control module that is downloaded into the controller and executable during run-time to generate and send the control signals to the one or field devices to thereby control the process in the process plant, a function block included in the control module, a process parameter, a unit corresponding to the first device, another device that accesses or acts on at least one of a process input or a process output of the first device, an event, or an alarm;
collecting a set of data for transmitting as the data stream, the set of data generated by the first device and including a set of values of one more parameters whose respective values vary as a result of the first device operating to control the process;
buffering the set of collected data;
transmitting, all of the set of metadata to a second device that is operable to receive the data stream, prior to transmitting the data stream to the second device; and
subsequent to transmitting the set of metadata to the second device, transmitting the data stream to the second device, wherein no further metadata are transmitted to the second device unless a trigger event causes the first device to transmit additional metadata.

14. The method according to claim 13, further comprising:
receiving, from the second device, a request for updated metadata;
generating or downloading the updated metadata; and
sending the updated metadata to the second device in response to the request for updated metadata.

15. The method according to claim 13, further comprising:
recognizing a changed configuration parameter;
generating or downloading updated metadata corresponding to the changed configuration parameter; and
sending the updated metadata to the second device before sending a data stream according to the updated metadata.

16. The method according to claim 13, wherein the description of the format of the data stream that is included in the set of metadata includes a respective identifier assigned by the first device to each of one or more respective instances of a respective function block, a respective control module, a respective parameter, a respective unit corresponding to the first device, a respective other device that accesses or acts on the at least one of the process input or the process output of the first device, a respective event, or a respective alarm.

17. The method according to claim 13, wherein respective descriptions of the types of data included in the data stream that are included in the set of metadata include a respective identifier assigned by a user to each of one or more of: a respective function block, a respective control module, a respective parameter, a respective unit corresponding to the first device, a respective other device that accesses or acts on the at least one of the process input or the process output of the first device, a respective event, or a respective alarm.

18. The method according to claim 13, wherein the second device comprises a big data appliance.

19. The method according to claim 13, further comprising performing an analysis on the set of data to generate analysis data.

20. The method according to claim 19, further comprising adding the analysis data to the data stream.

21. The method according to claim 13, wherein the data stream comprises a timestamp.

22. The method according to claim 21, wherein the data stream comprises a plurality of incremental timestamps, each incremental timestamp associated with a sub-set of data in the set of data.

23. The method according to claim 13, wherein the data stream comprises a plurality of identifiers defined by the set of metadata, and respective data corresponding to each identifier included in the plurality of identifiers.

24. A method for receiving a data stream in a process control system of a process plant, the method comprising:
receiving a set of metadata from a first device that is included in the process control system, and that is operable, during run-time of the process plant, to transmit the data stream and to control a process in the process plant to thereby generate a physical material or product,
the first device being one of (i) a controller communicatively connected to one or more field devices disposed in the process plant, the controller configured to send control signals to the one or more field devices to thereby control the process during run-time in the process plant, or (ii) one of the one or more field devices, and
the set of metadata comprising (i) respective descriptions of types of data included in the data stream and (ii) a description of a format of the data stream, and including respective identifiers of one or more portions of a configuration of the first device, the one or more portions of the configuration of the first device including at least one of: a control module that is downloaded into the controller and executable during run-time to generate and send the control signals to the one or more field devices to thereby control the process in the process plant, a function block included in the control module, a process parameter, a unit corresponding to the first device, another device that accesses or acts on at least one of a process input or a process output of the first device, an event, or an alarm;
receiving the data stream from the first device after receiving all of the set of metadata, the data stream including a set of data generated by the first device, and the set of data including a set of values of one or more parameters whose respective values vary as a result of the first device operating to control the process;
parsing the received data stream according to the set of metadata; and
continuing to receive streamed data from the first device as long as the data stream can be parsed according to the set of metadata.

25. The method according to claim 24, further comprising:
identifying, in the data stream, an identifier that cannot be parsed according to the set of metadata;
caching the data stream;
sending a request, to the first device that is operable to transmit the data stream, to provide updated metadata;
receiving the updated metadata;
parsing the cached data stream according to the updated metadata;
continuing to receive the data stream; and
parsing the data stream according to the updated metadata.

26. The method according to claim 24, further comprising:
receiving updated metadata from the first device;
continuing to receive the data stream from the first device; and
parsing the data stream according to the updated metadata, wherein the data stream received after the updated metadata is able to be parsed according to the updated metadata, and is not able to be parsed according to the set of metadata.

27. The method according to claim 24, wherein the description of the format of the data stream that is included in the set of metadata includes a respective identifier assigned by the first device to each of one or more respective instances of a respective function block, a respective control module, a respective parameter, a respective unit corresponding to the first device, a respective other device that accesses or acts on the at least one of the process input or the process output of the first device, a respective event, or a respective alarm.

28. The method according to claim 24, wherein respective descriptions of the types of data included in the data stream that are included in the set of metadata include a respective identifier assigned by a user to each of one or more of: a respective function block, a respective control module, respective parameter, a respective unit corresponding to the first device, a respective other device that accesses or acts on the at least one of the process input or the process output of the first device, a respective event, or a respective alarm.

29. The method according to claim 24, wherein the method is performed by a second device comprising a big data appliance.

30. The method according to claim 24, further comprising performing an analysis on the set of data to generate analysis data.

31. The method according to claim 30, wherein the analysis data are stored in a big data appliance.

32. The method according to claim 24, wherein the data stream comprises a timestamp.

33. The method according to claim 32, wherein the data stream comprises a plurality of incremental timestamps, each incremental timestamp associated with a sub-set of data in the set of data.

34. The method according to claim 24, wherein the data stream comprises a plurality of identifiers defined by the set of metadata, and respective data corresponding to each identifier included in the plurality identifiers.

35. An apparatus in a process control system of a process plant, the apparatus comprising:
a processor;
a data source providing data to the apparatus, the data source included in the process control system and operable, during a run-time of the process plant, to control a process in the process plant to thereby generate a physical material or product, the data generated by the data source including a set of values of one or more parameters whose respective values vary as a result of the data source operating to control the process, and the apparatus being one of (i) a controller communicatively connected to one or more field devices disposed in the process plant, the controller configured to send control signals to the one or more field devices to thereby control the process during run-time in the process plant, or (ii) one of the one or more field devices;
a memory communicatively coupled to the processor and storing a set of metadata, the set of metadata comprising (i) respective descriptions of types of the data and (ii) a description of a format of the data, and including respective identifiers of one or more portions of a configuration of the apparatus, the one or more portions of the configuration of the apparatus including at least one of: a control module that is downloaded into the controller and executable during run-time to generate and send the control signals to the one or more field devices to thereby control the process in the process plant, a function block included in the control module, a process parameter, a unit corresponding to the first device, another device that accesses or acts on at least one of a process input or a process output of the first device, an event, or an alarm;
a queuing routine executing on the processor to buffer data received from the data source; and
a data streaming routine executing on the processor and cooperating with a communication device to:
transmit all of the stored set of metadata to a receiving device prior to transmitting the data stream to the receiving device;
assemble the buffered data into a data stream according to the stored set of metadata; and
transmit the data stream to the receiving device.

36. The apparatus according to claim 35, wherein the apparatus is the controller, the data source comprises one or more process control devices whose generated data is received at an input of the controller, and the apparatus further comprises:
one or more routines executing on the processor to control the process according at least in part based on the received data; and
a collection routine executing on the processor and collecting the data received from the one or more process control devices.

37. The apparatus according to claim 35, wherein the data streaming routine executing on the processor is further operable to:
receive a request for updated metadata;
generate or download updated metadata; and
send the updated metadata in response to the request for updated metadata.

38. The apparatus according to claim 35, further comprising a metadata updating routine operable to receive or generate updated metadata, and wherein the data streaming routine executing on the processor is further operable to:
send updated metadata in response to a detected change in the configuration of the apparatus or in response to the generation or reception of updated metadata; and
continue sending the data stream, wherein the data stream sent after the updated metadata are sent is structured according to the updated metadata.

39. The apparatus according to claim 35, wherein the description of the format of the data stream that is included in the set of metadata includes a respective identifier assigned by the data source or the apparatus to each of one or more respective instances of a respective function block, a respective control module, a respective parameter, a respective unit corresponding to the first device, a respective other device that accesses or acts on the at least one of the process input or the process output of the first device, a respective event, or a respective alarm.

40. The apparatus according to claim 35, wherein the respective descriptions of the types of data included in the data stream that are included in the set of metadata include a respective identifier assigned by a user to each of one or more of: a respective function block, a respective control module, a respective parameter, a respective unit corresponding to the first device, a respective other device that accesses or acts on the at least one of the process input or the process output of the first device, a respective event, or a respective alarm.

41. The apparatus according to claim 35, wherein the receiving device comprises a big data appliance.

42. The apparatus according to claim 35, further comprising an analysis routine executing on the processor to analyze the received data to generate analysis data.

43. The apparatus according to claim 42, wherein the data streaming routine executing on the processor is further operable to add the analysis data to the data stream.

44. The apparatus according to claim 35, wherein the data stream comprises a timestamp.

45. The apparatus according to claim 44, wherein the data stream comprises a plurality of incremental timestamps, each incremental timestamp associated with a sub-set of data in the data.

46. The apparatus according to claim 35, wherein the data stream comprises a plurality of identifiers defined by the set of metadata, and respective data corresponding to each identifier included in the plurality of identifiers.

47. An apparatus for receiving a stream of big data in a process control system of a process plant, the apparatus comprising:
a processor;
a memory communicatively coupled to the processor;
a non-transitory memory device; and
a receiver operable to:
receive a set of metadata, the set of metadata comprising (i) respective descriptions of types of data included in a data stream and (ii) a description of a format of the data stream, and including respective identifiers of one or more portions of a configuration of the particular device, the one or more portions of the configuration of the particular device including at least one of: a control module that is downloaded into the controller and executable during run-time to generate and send the control signals to the one or more field devices to thereby control the process in the process plant, a function block included in the control module, a process parameter, a unit corresponding to the first device, another device that accesses or acts on at least one of a process input or a process output of the first device, an event, or an alarm;
receive the data stream after receiving all of the set of metadata, the data stream including data generated by a particular device that is included in the process control system and that is operable, during run-time of the process plant, to control a process in the process plant to thereby generate a physical material or product, the particular device being one of (i) a controller communicatively connected to one or more field devices disposed in the process plant, the controller configured to send control signals to the one or more field devices to thereby control the process during run-time in the process plant, or (ii) one of the one or more field devices, and the data generated by the particular device including a set of values of one or more parameters whose respective values vary as a result of the particular device operating to control the process;
parse the data stream according to the set of metadata;
process the data included in the data stream according to the parsing; and
continue to receive and process data as long as the data stream can be parsed according to the set of metadata.

48. The apparatus according to claim 47, wherein the apparatus is a big data appliance for storing big data, wherein the non-transitory memory device comprises a high fidelity data storage device, and wherein processing data comprises storing the data in the high fidelity data storage device.

49. The apparatus according to claim 47, wherein the receiver is further operable to:
 identify in the data stream an identification that cannot be parsed according to the set of metadata;
 cache the data stream;
 send a request to provide updated metadata;
 receive the updated metadata;
 parse the cached data stream according to the updated metadata;
 process the data included in the cached data stream according to the parsing;
 continue to receive the data stream;
 parse the continued data stream according to the updated metadata; and
 process the data from the continued data stream.

50. The apparatus according to claim 47, wherein the receiver is further operable to:
 receive updated metadata;
 continue to receive the data stream; and
 parse the continued data stream according to the updated metadata,
 wherein the data stream received after the updated metadata is able to be parsed according to the updated metadata, and is not able to be parsed according to the set of metadata.

51. The apparatus according to claim 47, wherein the description of the format of the data stream that is included in the set of metadata includes a respective identifier assigned by the first device to each of one or more respective instances of a respective function block, a respective control module, a respective parameter, a respective unit corresponding to the first device, a respective other device that accesses or acts on the at least one of the process input or the process output of the first device, a respective event, or a respective alarm.

52. The apparatus according to claim 47, wherein respective descriptions of the types of data included in the data stream that are included in the set of metadata include a respective identifier assigned by a user to each of one or more of: a respective function block, a respective control module, a respective parameter, a respective unit corresponding to the first device, a respective other device that accesses or acts on the at least one of the process input or the process output of the first device, a respective event, or a respective alarm.

53. The apparatus according to claim 47, wherein the apparatus is operable to stream big data to a downstream device.

54. The apparatus according to claim 47, further comprising an analysis module operable to perform an analysis on the data included in the data stream to generate analysis data.

55. The apparatus according to claim 54, wherein the analysis data are stored in the non-transitory memory device.

56. The apparatus according to claim 47, wherein the data stream comprises a timestamp.

57. The apparatus according to claim 56, wherein the data stream comprises a plurality of incremental timestamps, each incremental timestamp associated with a sub-set of data in the data stream.

58. The apparatus according to claim 47, wherein the data stream comprises a plurality of identifiers defined by the set of metadata, and respective data corresponding to each identifier included in the plurality of identifiers.

* * * * *